(12) United States Patent
Banks et al.

(10) Patent No.: US 6,414,465 B1
(45) Date of Patent: Jul. 2, 2002

(54) METHOD AND APPARATUS FOR CHARGING A LEAD ACID BATTERY

(75) Inventors: Anthony William Banks, Dickson; Hugh Edward Hickerson, Jr., Nashville; William Thomas Hopkins, Dickson, all of TN (US)

(73) Assignee: France/Scott Fetzer Company, Fairview, TN (US)

( * ) Notice: Subject to any disclaimer, the term of this patent is extended or adjusted under 35 U.S.C. 154(b) by 0 days.

(21) Appl. No.: 09/887,309

(22) Filed: Jun. 22, 2001

(51) Int. Cl.[7] ........................ H01M 10/46; H01M 10/44
(52) U.S. Cl. ..................... 320/118; 320/131; 320/160
(58) Field of Search ............................. 320/118, 119, 320/100, 127, 129, 130, 131, 137, 125, 160, 139

(56) References Cited

U.S. PATENT DOCUMENTS

| | | |
|---|---|---|
| 5,250,904 A | 10/1993 | Salander et al. |
| 5,371,454 A | 12/1994 | Marek |
| 5,583,416 A | 12/1996 | Klang |
| 5,589,757 A | 12/1996 | Klang |
| 5,670,863 A | 9/1997 | Broell et al. |
| 5,710,506 A | 1/1998 | Broell et al. |
| 5,869,969 A | 2/1999 | Cividino et al. |
| 5,969,506 A | 10/1999 | Neal |
| 6,016,048 A | 1/2000 | Davidson |
| 6,204,645 B1 | 3/2001 | Cullen |

*Primary Examiner*—Edward H. Tso
(74) *Attorney, Agent, or Firm*—Wood, Herron & Evans, L.L.P.

(57) ABSTRACT

A battery charger for a lead acid battery having a power supply with an input connected to an AC signal and an output connected to the battery. The power supply provides a charge current to the battery. A clock connected to the AC signal provides clock pulses having transitions synchronized with zero crossings of the AC signal. A voltage monitor connected to the battery detects a battery voltage substantially simultaneously with a zero value of the charge current. A charge mode control is connected to the clock and the voltage monitor for commanding different battery charge currents. The voltage monitor includes a temperature compensation circuit. The battery charger includes a display module that can be placed at a location remote from the battery charger and convenient to the user. The battery charger executes a battery charge cycle in which absorption and equalization charge times are variable and automatically set as a function of the state of discharge of the battery, that is, as a function of the bulk charge time. During an initial evaluation period, the battery is tested for a deep discharge condition, and if detected, a desulfation charge current is automatically applied for a time period, for example, two hours.

37 Claims, 15 Drawing Sheets

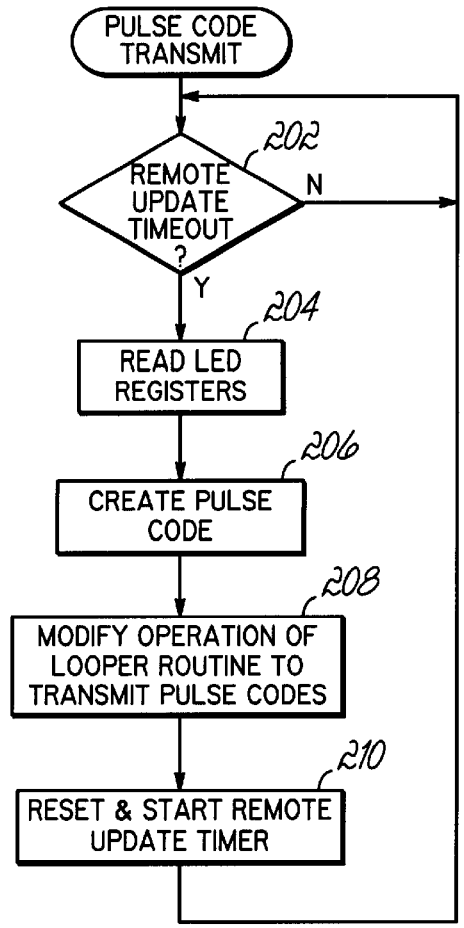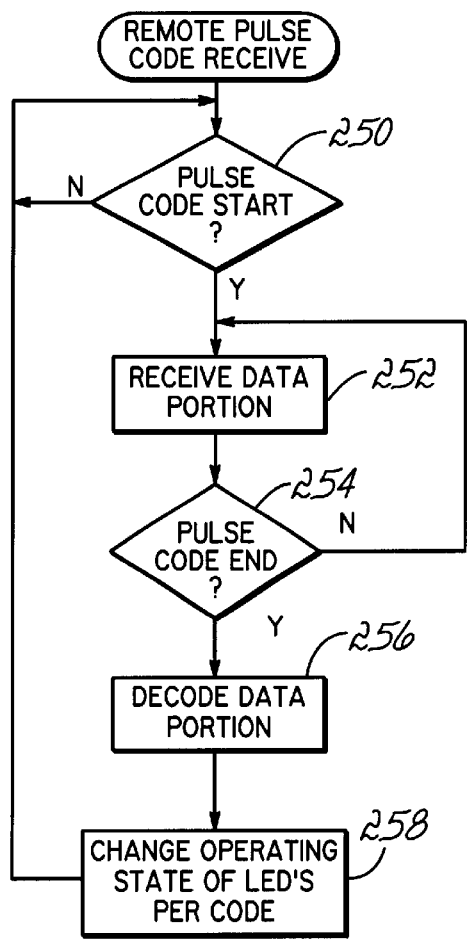
FIG. 14
FIG. 15

METHOD AND APPARATUS FOR CHARGING A LEAD ACID BATTERY

FIELD OF THE INVENTION

This invention relates to battery chargers and more particularly, to an improved battery charger for a lead acid battery.

BACKGROUND OF THE INVENTION

The ability of a lead-acid battery to deliver large amounts of electrical power is well known, particularly when associated with the starting of internal combustion engines. Likewise, the need to recharge these batteries and the problems associated therewith are also well known.

Many limitations and faults found in lead-acid batteries and other types of batteries are often the result of poor recharging control. Known battery chargers have various operating cycles to accommodate different battery charge states. For example, first, as a battery discharges, acid combines with the lead to form lead sulfate on the plates. This reduces the plate surface area and lowers the specific gravity of the electrolyte as well as the battery capacity. To properly charge the battery, all of the lead sulfate must be reacted or removed from the plates. Further, it is necessary that a battery charging cycle or process accommodate various degrees of lead sulfate plate deposits from readily removable lead sulfate deposits to lead sulfate deposits that are stubborn and more difficult to remove.

Second, to fully charge a battery, battery cells need to be charged above their nominal voltage in order to equalize their voltages. Such a battery charging cycle is referred to as an equalization charge cycle. Overcharging a battery to about 125% of its nominal voltage causes the electrolyte to bubble as hydrogen and oxygen are produced in the charging process. Such action also assists in the removal of sulfate particles from the plates as well as equalizing cell voltages. However, the charge current during an equalization cycle must be controlled. If the charge current is too great, overcharging occurs that wastes energy, causes excessive loss of electrolyte, often reduces the battery life, and may permanently damage the battery. On the other hand, undercharging the battery limits its capacity, thereby reducing its service life between charges and may lead to a degradation of the battery that is often unrecoverable.

Of particular interest is the use of wet cell or flooded lead acid batteries in marine applications, for example, a fishing boat. It is desirable that a battery be fully charged so that it lasts over a full day of fishing. Batteries with a shorter service life result in an unwanted interruption in the fishing activity; and such an interruption has significant consequences during a competitive fishing event. Currently, batteries on fishing boats are charged for several hours at night with first a standard battery charger. Thereafter, during the night, the battery is often charged with a second, high current charger to provide an equalization charge cycle. The use of a high current often stresses the battery with a severe overcharge condition.

There are known battery chargers that detect different levels of battery discharge and provide different battery charge cycles; however, such chargers utilize relatively complex circuits and are relatively expensive. Further, such battery chargers often do not charge a battery to its full potential charge without overcharging the battery. Consequently, there is a need for a simple and reliable charger for a lead acid battery that automatically and consistently provides a fully charged battery in response to a wide range of battery discharge conditions and ambient temperatures.

SUMMARY OF THE INVENTION

The present invention is an improved battery charger for lead acid batteries that consistently provides a fully charged battery independent of battery discharge condition. The battery charger of the present invention has the advantage of always providing the user with a battery that will have the longest possible service life. Further, the battery's service life is not diminished by undercharging or overcharging. The battery charger of the present invention is particularly useful in marine applications, for example, on fishing boats. The battery charger of the present invention as the advantage of always providing a user with a battery that has the longest possible life between charges, thereby minimizing unwanted interruptions to the user's activities and the consequences thereof.

According to the principles of the present invention and in accordance with the preferred embodiments, the invention provides a method of charging a lead acid battery by first applying a main charge current to the battery for a first time period that terminates upon a battery voltage rising to a first magnitude. Thereafter, applying an absorption charge current to the battery for a second time period determined as a function of, for example, one-half of, a time elapsing from an application of the main charge current until the battery voltage rises to the first magnitude. The length of time to charge a battery to a given voltage level is generally dependent on the degree of discharge of a battery. By automatically setting an absorption charge time proportional to the main charge time, the absorption charge time is automatically set to be generally dependent on the state of discharge of the battery. Therefore, this feature contributes to the capability of the battery charger to consistently provide fully charged batteries independent of the state of discharge.

In another embodiment, the invention provides a method of charging a lead acid battery by first applying a main charge current to the battery for a first time period that terminates upon a battery voltage rising to a first magnitude. Thereafter an absorption charge current is applied to the battery for a second time; and then an equalization charge current is applied to the battery for a third time period determined as a function of a length of the second time period. By automatically setting the equalization charge time generally proportional to the absorption charge time, the equalization charge time is automatically set to be generally dependent on the state of discharge of the battery. This feature also contributes to the capability of the charger to consistently provide fully charged batteries independent of the state of discharge.

In a further embodiment, the invention provides a method of charging a lead acid battery by detecting a first battery voltage before applying a charge current. After applying an evaluation current to the battery during an evaluation time period, a second battery voltage is detected. Next a deep discharge condition is determined to exist in response to the first battery voltage being below a first voltage reference and the second battery voltage being above a second voltage reference. A desulfation charge current is applied for a time period, for example, two hours, in response to determining a deep discharge condition. By automatically detecting a deep discharge condition and executing a desulfation charge cycle, the capability of the charger to consistently provide fully charged batteries is further enhanced.

In yet another embodiment, the invention provides a battery charger for a lead acid battery having a power supply with an input connected to an AC signal and an output connected to the battery. The power supply provides a charge current to the battery. A clock connected to the AC signal provides output clock pulses having transitions synchronized with zero crossings of the AC signal. A voltage monitor connected to the battery detects a battery voltage substantially simultaneously with a zero value of the charge current. A charge mode control is connected to the clock and the voltage monitor for commanding different battery charge currents. Measuring battery voltage in the absence of charge current provides a more accurate battery voltage measurement.

In one aspect of this embodiment, the voltage monitor has a temperature compensation circuit that uses a diode having a forward voltage drop with a temperature coefficient of about $-2$ mv/° C. at a constant current. A multiplier is connected to the diode and provides an output with a temperature coefficient of about $-4$ mv/° C. The voltage monitor has a voltage divider on one input that divides the battery voltage to that of one battery cell and a voltage reference input connected to the temperature compensation circuit. Therefore, the battery voltage measurement is temperature compensated to match the temperature coefficient of a flooded lead acid battery cell, that is, about $-4$ mv/° C. A more accurate battery voltage sampling better reflects the true battery voltage with the advantage of providing more consistently charged batteries under different environmental conditions.

In another aspect of the invention, the battery charger includes a module that can be placed at a location remote from the battery charger and convenient to the user. The module provides sensory perceptible indicators, for example, LEDs, representing operational states of the battery charger.

These and other objects and advantages of the present invention will become more readily apparent during the following detailed description taken in conjunction with the drawings herein.

BRIEF DESCRIPTION OF THE DRAWINGS

FIG. 14 is a waveform diagram illustrating how interruptions in the charge current pulses can be translated into a current pulse code.

FIG. 15 is a flowchart illustrating a process by which signal states are received by a remote module implemented with the battery charger of FIG. 1.

DETAILED DESCRIPTION OF THE INVENTION

Figure 1:
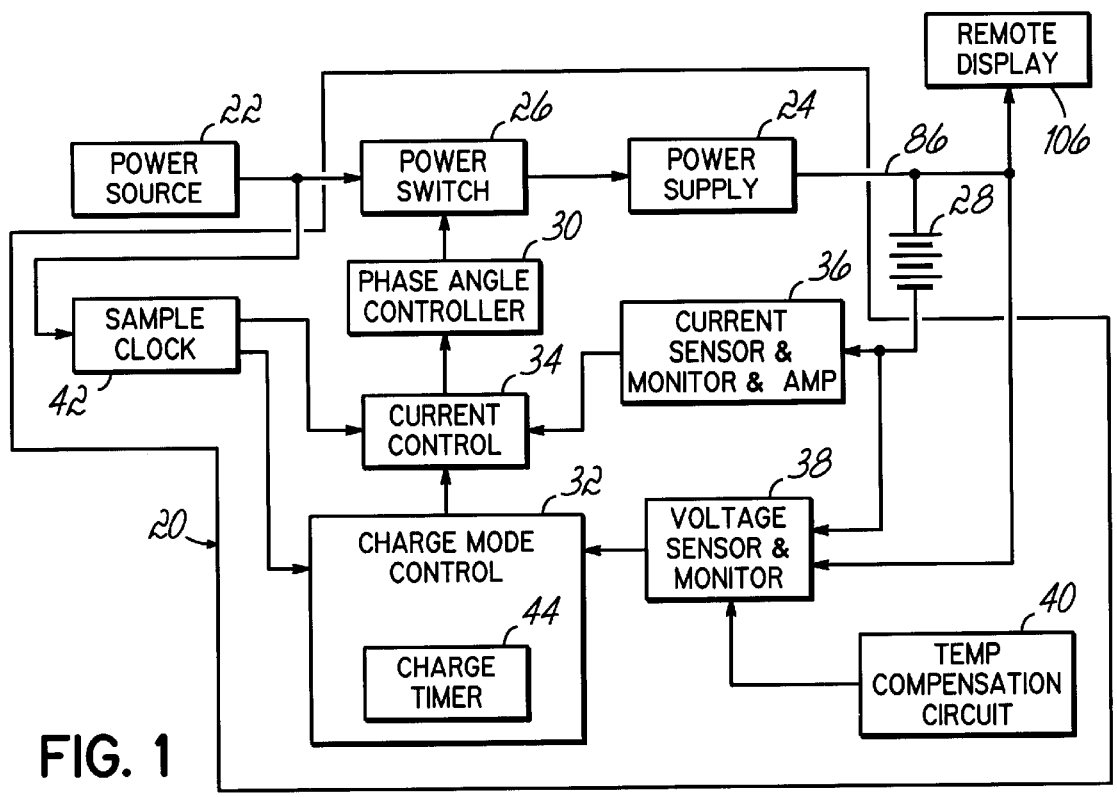
FIG. 1 is an overall block diagram of a battery charger for a lead acid battery in accordance with the principles of the present invention.

Referring to FIG. 1, a battery charger 20 is electrically connected to a power source 22, for example, a source of AC power. The battery charger 20 has a power supply 24 that is electrically connected to the power source 22 via a power switch 26, for example, a triac. Turning the power switch 26 on and off provides power to the power supply 24 which, in turn, supplies a DC charge current to a wet cell or flooded lead acid battery 28 in order to charge the battery 28 to a desired voltage level. The magnitude of charge current supplied by the power supply 24 is varied by a phase angle controller 30 that controls the power switch 26. The desired charge current at a particular time in a charge cycle is determined by a charge mode control 32. That desired charge current is compared in a current control 34 with a measured battery current detected by the current sensor and monitor 36. The current control 34 controls the phase angle controller 30 such that the charge current supplied by the power supply 24 is substantially equal to the desired current determined by the charge mode control 32. The charge mode control 32 is also responsive to a voltage sensor and monitor 38 that monitors the output voltage of the battery 28. The voltage of the battery 28 varies with temperature; and therefore, a temperature compensation circuit 40 provides a temperature dependent voltage reference to the voltage sensor and monitor 38.

The charger 20 further includes a clock 42 that is synchronized with the zero crossings of the AC power source 22. The output of the clock 42 is used by the current control 34 to precisely control the phase angle controller 30. In addition, the voltage sensor and monitor 38 uses the clock 42 to measure the voltage of the battery 28 when the charge current from the power source 22 is substantially at zero. The charge mode control 32 has an internal charge timer 44 to measure the durations of various charge modes. Thus, the charge mode control 32 switches from one charge mode to another either in response to an elapsed time or, the battery 28 being charged to a particular voltage level.

Figure 2A:
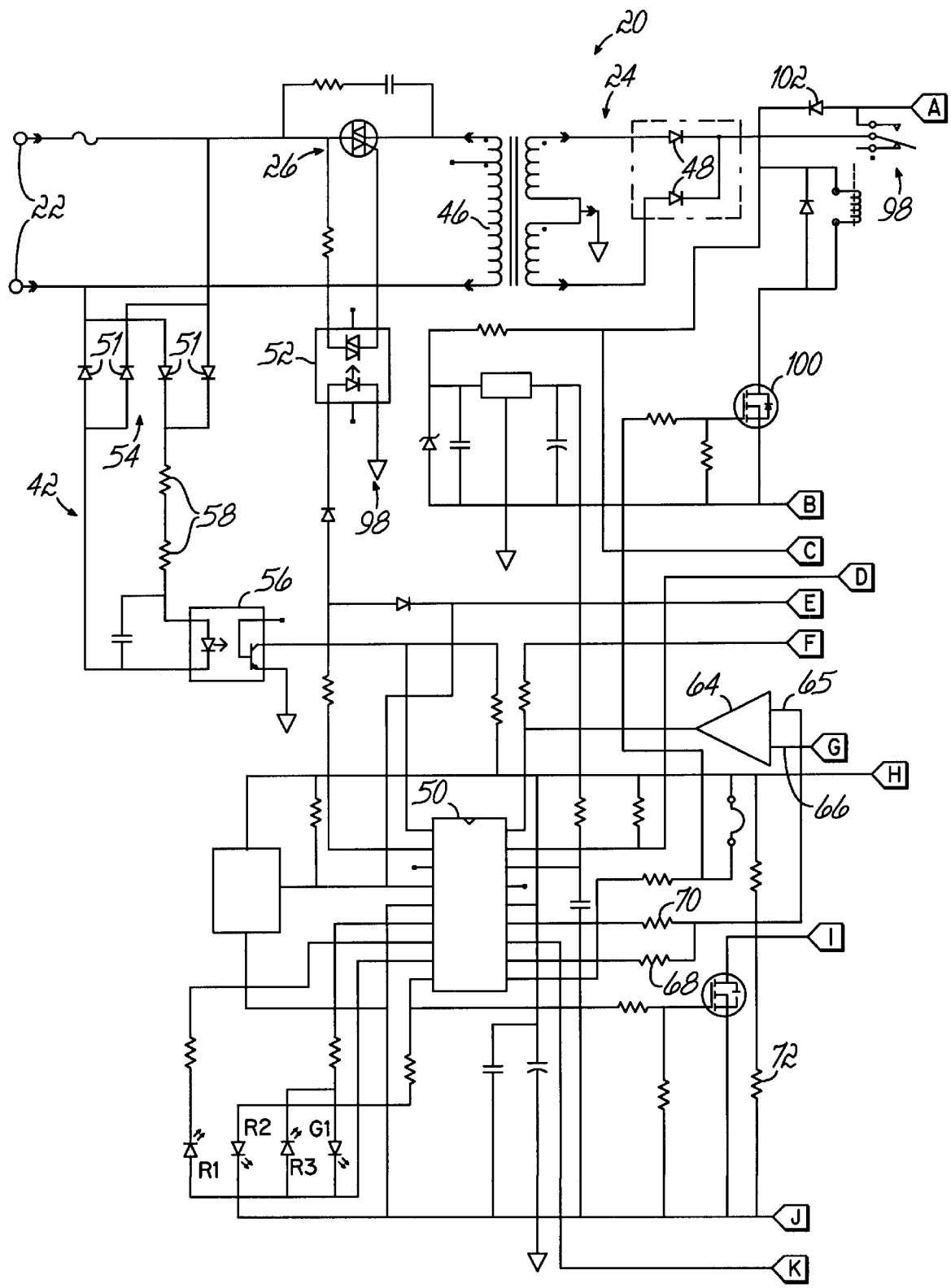
FIGS. 2A and 2B are detailed schematic diagrams illustrating one embodiment of the battery charger of FIG. 1.
Figure 2B:
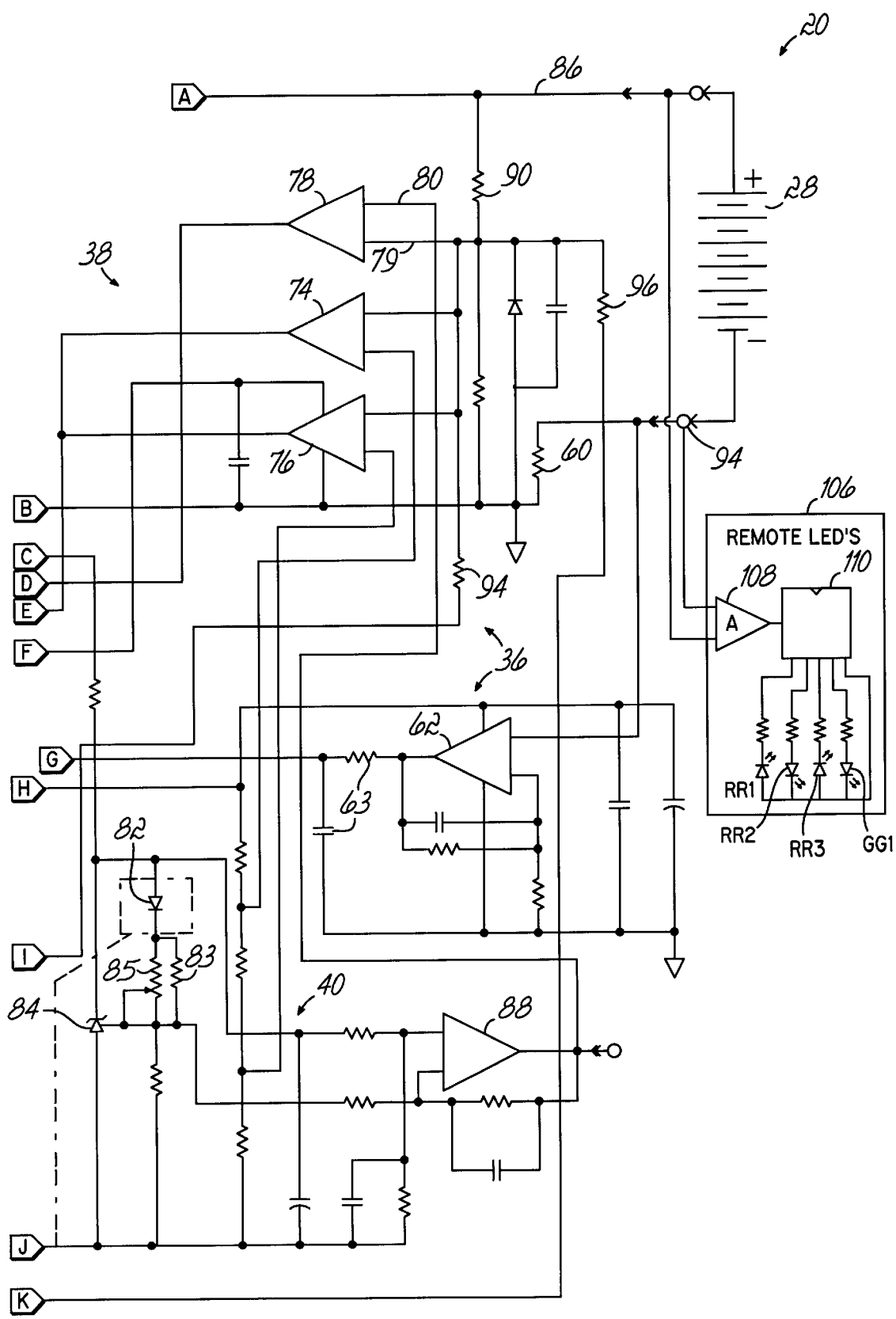

Referring to FIGS. 2A and 2B, the power supply 24 includes a step down transformer 46 and diodes 48. The functions of the phase angle controller 30, the charge mode control 32, current control 34 and charge timer 44 are implemented within a microcontroller 50 but include related circuitry connected to the microcontroller 50. A clock 54 is derived from an AC signal from the source 22 and provides 120 Hz clockpulses to the microcontroller 50 that are synchronized with the zero crossings of the AC signal. Diodes 51 act as a full wave bridge rectifier and send a 120 Hz signal to optocoupler 56 via current limiting resistors 58.

The output of optocoupler 56 supplies the 120 Hz clock pulses to the microcontroller 50.

The current sensor and monitor 36 includes a current sensing resistor 60 that is in series with the circuit ground, amplifier 62, and related circuitry. The amplifier 62 amplifies and integrates the voltage across resistor 60 and provides a current feedback signal to one input 65 of a comparator 64. If the current feedback signal exceeds a current reference $I_{SENSE}$ on the other comparator input 66, the output of the comparator 64 changes state; and the microcontroller 50 reduces the on-time of the triac 26. If the output of the comparator 64 does not change state, the microcontroller 50 will subsequently increase the on-time of the triac 26, thereby increasing the magnitude of the charge current to the battery 28 and driving the current feedback signal toward the current reference. The current reference is changed by the microcontroller 50 switching resistors 68 and/or 70 in parallel with resistor 72.

Comparators 74, 76 are used to detect overvoltage and undervoltage conditions, respectively. For example, if a user short circuits the output of the battery charger 20, the triac 26 is turned off. In addition, the undervoltage comparator 76 switches state; and relay 98 is deenergized, thereby disconnecting the output lead 86 from the power supply 24. Thus, if either condition exists, the microcontroller 50 is reset, thereby turning off the triac 26 and deenergizing relay 98 to turn off the power supply 20. Normally, the battery charger 20 cannot be further operated until the user disconnects and then reconnects the battery charger 20 to the power source 22.

The comparator 78 monitors the voltage of the battery 28 on one input 79 with respect to a temperature compensated voltage reference $V_{SENSE}$ on input 80. Each cell of a lead acid battery has a temperature coefficient of approximately −4 millivolts per degree Celsius ("mv/° C.") over a temperature range used in the majority of applications of the battery charger 20. A 12 V battery has six serially connected cells of 2 V each, thereby providing a battery voltage of 12 V with a temperature coefficient of 24 mv/° C. Therefore, in order to provide the most accurate sensing of battery voltage, a compensation is provided for that temperature coefficient.

In the battery charger 20, temperature compensation is provided by a forward voltage drop of a small signal diode 82. The forward voltage drop of the diode 82 has a temperature coefficient of −2 mv/° C. An accurate 2.5 V reference chip 84 provides a constant current through the diode 82. The diode 82 is mounted in one of the charger output leads 86 so that it is in close proximity to the battery 28. An amplifier 88 has a gain of 2 and doubles the voltage across the resistors 83, 85. The resistor 85 permits an adjustment of the voltage. The amplifier 88 supplies a voltage reference signal on input 80 of comparator 78 that has a temperature coefficient of −4 mv/° C. Thus, the voltage reference is modified by a real time and continuous temperature compensation that is determined by a temperature sensor in the proximity of the battery 28. The output voltage of the battery 28 is divided by resistors 90, 92 to approximately one-sixth the nominal battery voltage, that is, the nominal voltage of one battery cell. Therefore, the temperature coefficient of −4 mv/° C. on input 80 is appropriate. The voltage reference on input 80 is changed by switching resistors 94, 96 in parallel with resistor 92.

Relay 98 is used to electrically connect and disconnect the power supply 24 to the output lead 86 and also provide reverse polarity protection. If the battery 28 is improperly connected, relay 98 is not turned on by a switch 100 that is controlled by the microcontroller 50. The diode 102 allows current to flow into the bias circuit only when the battery 28 is properly connected to the charger 20. The various charge modes of the battery charger 20 are indicated to a user by the illumination of red LEDs R1, R2 and R3 and a green LED G1.

Figure 3A:
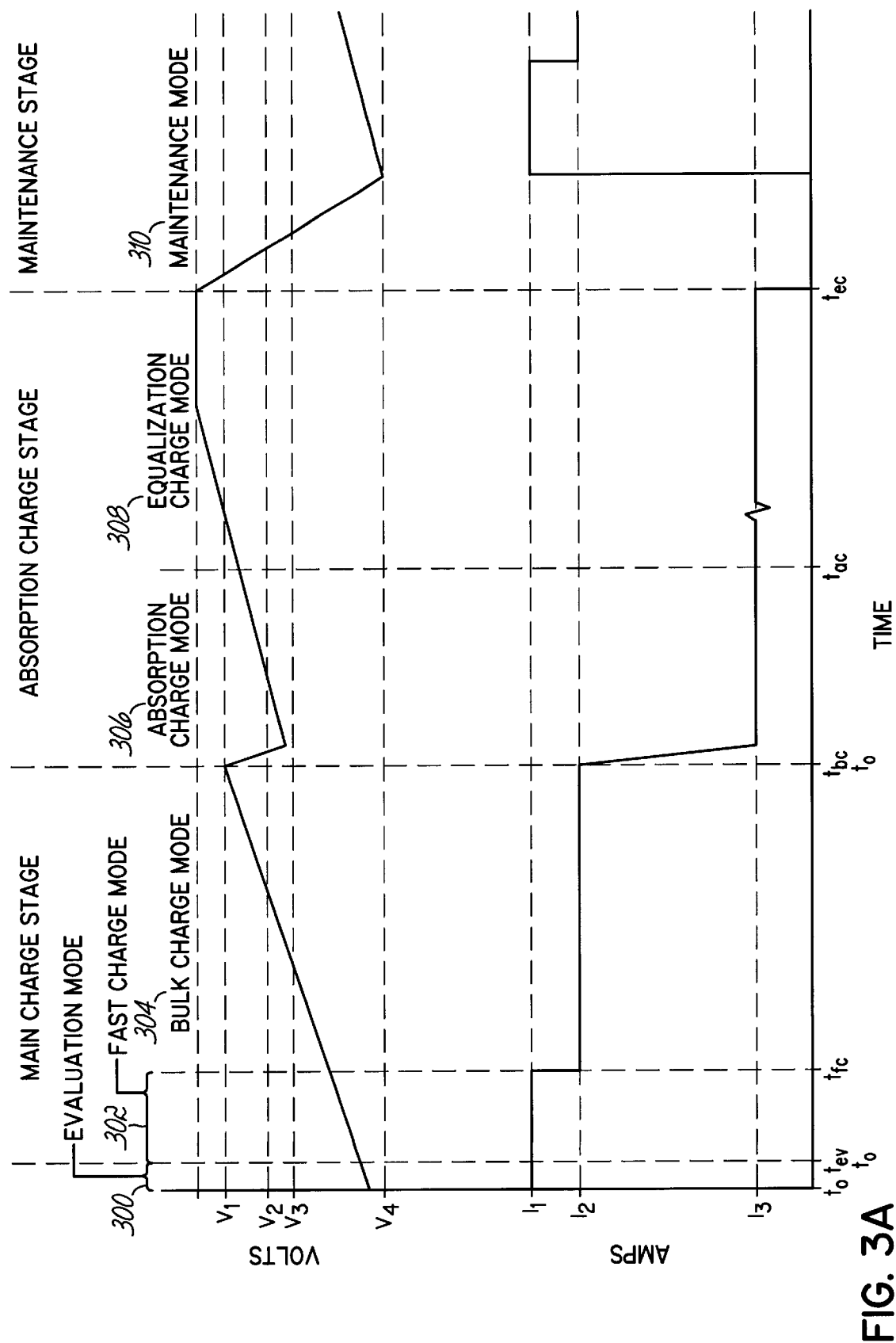
FIGS. 3A and 3B illustrate nominal voltage and current waveforms provided by different charge modes within a full battery charging cycle of the battery charger of FIG. 1.

Referring to FIG. 3A, the battery charger 20 provides six different modes or stages during a full cycle of charging the battery 28. A charge mode control 32 that is a programmed function within the microcontroller 50 switches the battery charger 20 from one charge mode to another. Upon the charger 20 being initially turned on, that is, connected to the power source 22, the charger undergoes a series of power on diagnostics or tests to make sure that the charger is operating properly. Such power on diagnostics may include a test to determine whether the battery charger 20 is electrically connected to the battery 28. If it is, the charge mode control 32 then proceeds to initiate an evaluation mode 300 of FIG. 3A.

Figure 4:
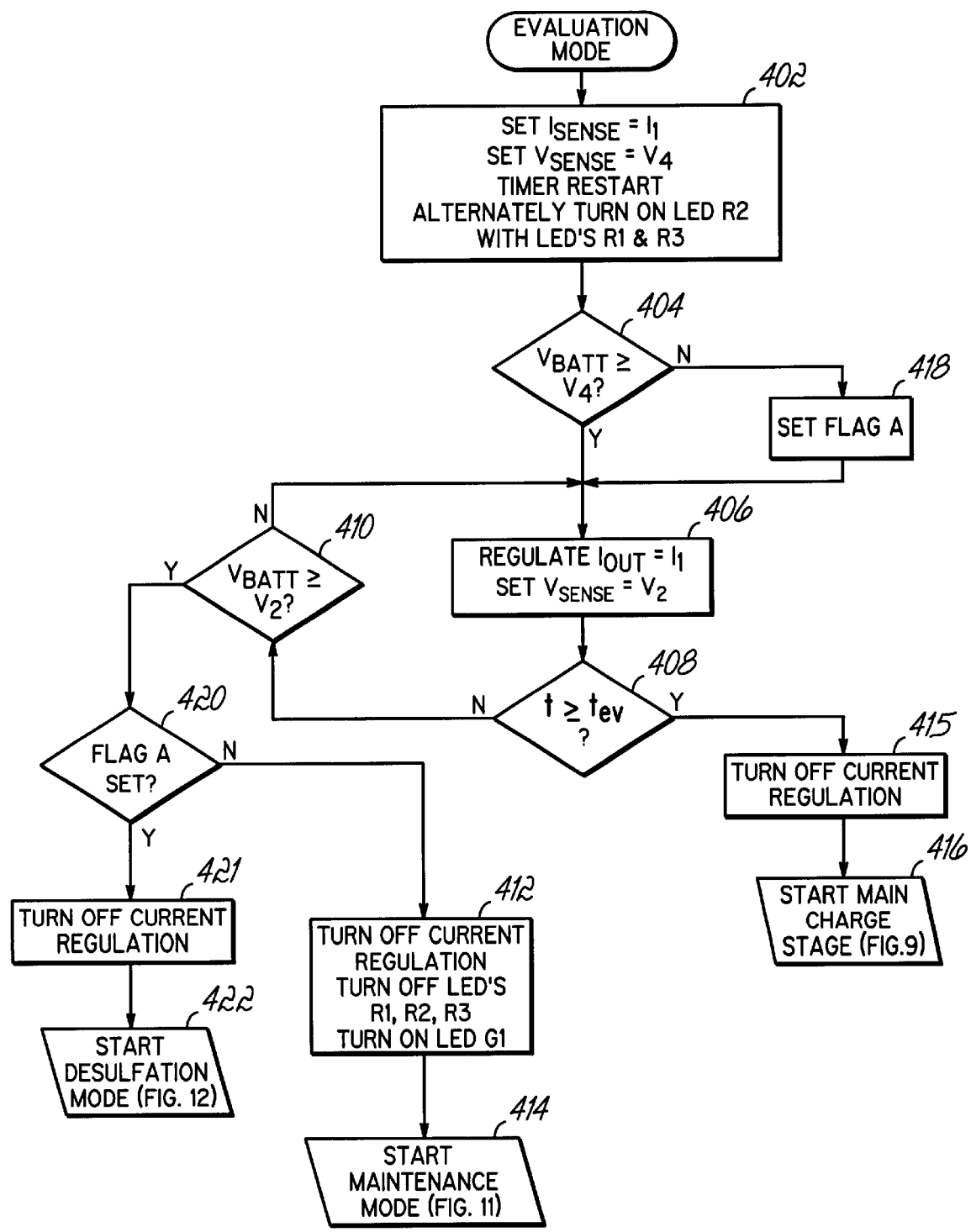
FIG. 4 is a flowchart illustrating an evaluation charge mode within the overall battery charging process implemented by the battery charger of FIG. 1.

The evaluation mode is of a brief time duration, for example, one minute, and is used to determine the current state of charge of the battery 28. The evaluation mode detects three different charge conditions or states, that is, a normal discharge condition, a fully charged battery and a condition of stubborn lead sulfate plate deposits. Referring to FIG. 4, at 402, by switching the appropriate resistors 68, 70 (FIG. 2A), a current reference $I_{SENSE}$ equal to $I_1$ is applied to the input 66 of the comparator 64. The current reference $I_1$ is the largest current reference, for example, about 10 amps for a 10 amp charger. Further, by switching the appropriate resistors 94, 96 (FIG. 2B), the voltage reference $V_{SENSE}$ on input 80 of the voltage comparator 78 is set to $V_4$. The voltage reference $V_4$ is the lowest voltage reference, for example, about 12.6V for a 10 amp charger. The microcontroller 50 also resets and starts the charge timer 44; and the microcontroller 50 indicates the evaluation mode by alternately illuminating the red LED R2 with the red LEDs R1 and R3 in a blinking manner. Thereafter and prior to turning on the current, the microcontroller 50 detects, at 404, whether the output of the comparator 78 is equal to the voltage reference $V_4$. If it is, the microcontroller then, at 406, switches the resistors 94, 96 such that a reference voltage $V_2$, for example, about 13.8 V for a 10 amp charger, is applied to the input 80 of the voltage comparator 78. In addition, the microcontroller 50 initiates and regulates the charge current on the battery charger lead 86 to a magnitude substantially equal to $I_1$.

The microcontroller 50 then checks that an elapsed time of one minute being measured by the charge timer 44 has ended. If not, the processor, at 410, determines whether the battery voltage is greater than the reference $V_2$. If it is, and flag A is not set, the microcontroller, at 412, turns off the current regulation, turns off the red LEDs R1, R2, R3, and turns on the green LED G1, thereby indicating a fully charged battery. Thereafter, the charge mode control 32 within the microcontroller 50 switches the operation of the battery charger 20 to a maintenance stage, at 414, to be later described.

If the microcontroller 50 determines that the battery voltage was initially greater than the voltage reference $V_4$ but did not reach the voltage reference $V_2$, a determination is made that the battery has experienced a normal discharge. The charge mode control 32 then, at 415, turns off the current regulation, and, at 416, initiates or starts the main charge mode. However, if at 404, the battery voltage was detected to be less than the reference $V_4$, a flag A is set at

418. Further, if later during the evaluation cycle, the battery voltage rises to a value equal to reference $V_2$ and the processor detects, at 420, that flag A is set, a determination is made that the battery contains more stubborn or more difficult to remove lead sulfate plate deposits. The charge mode control 32 then, at 421, turns off the current regulation and, at 422, switches the operation of the battery charger 20 to a desulfation charge mode.

Figure 5:
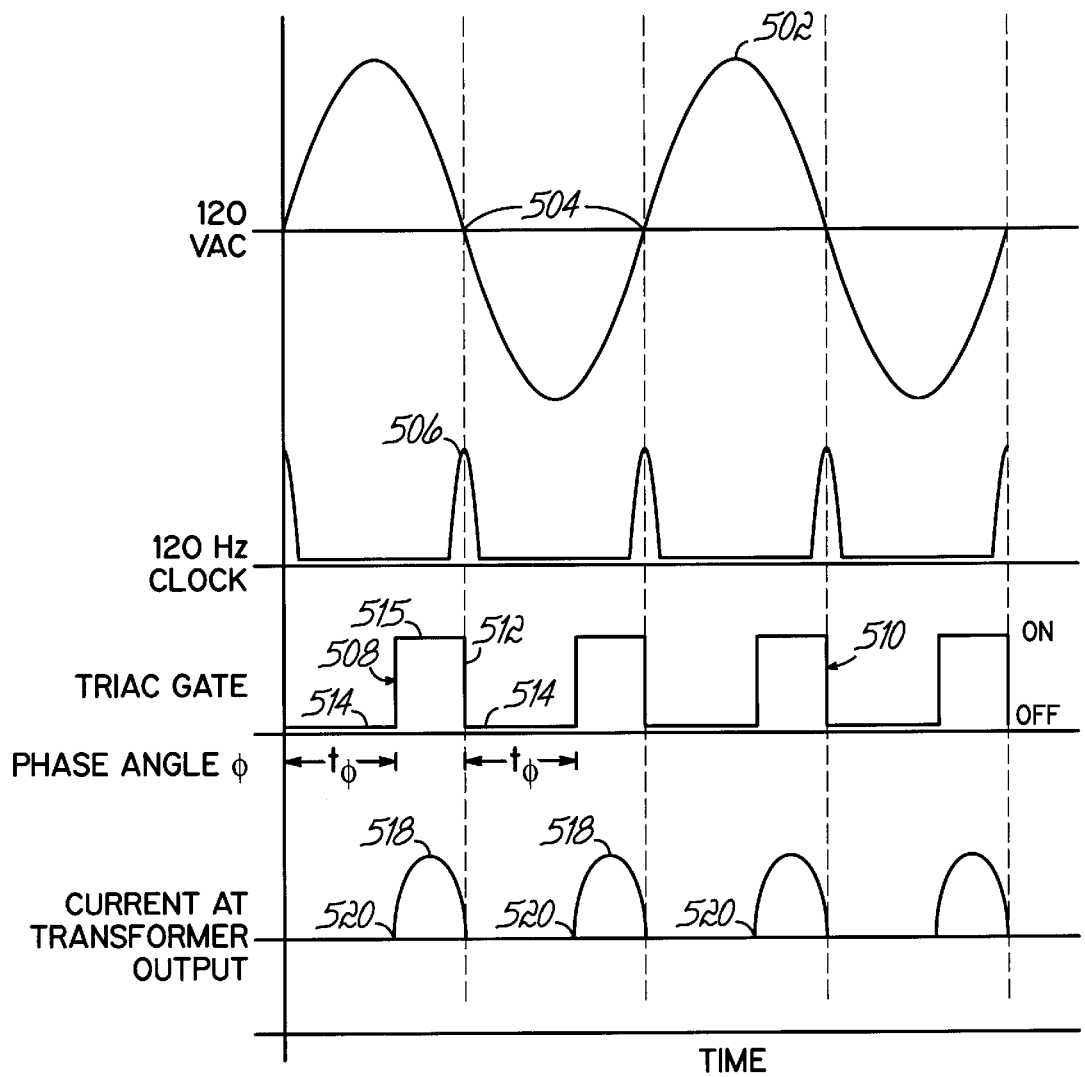
FIG. 5 illustrates nominal waveforms of signals within the battery charger of FIG. 1.
Figure 6:
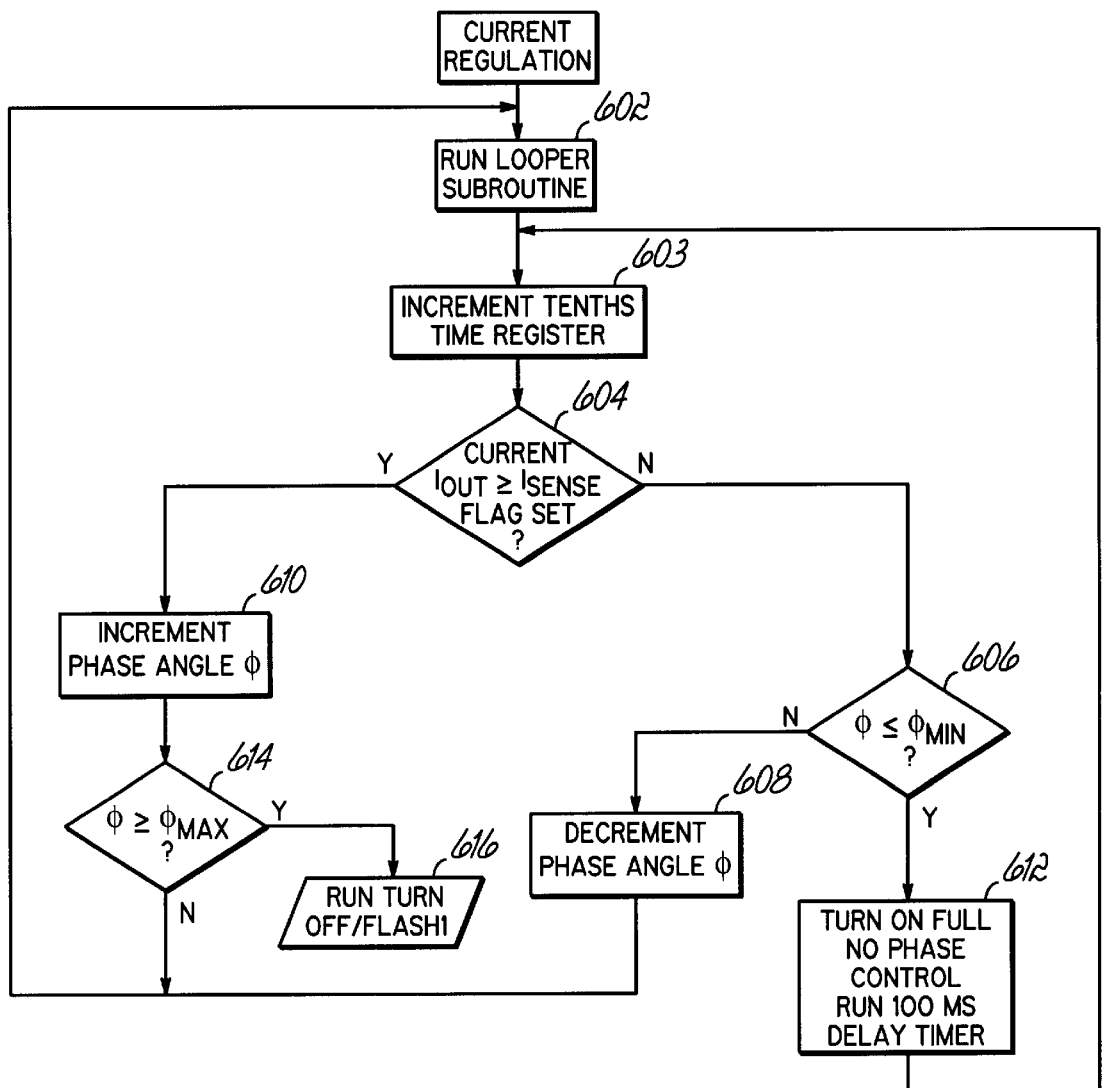
FIG. 6 is a flowchart illustrating a current regulation subroutine within the overall battery charging process implemented by the battery charger of FIG. 1.

During the period of the evaluation mode, the charge current is being regulated to a larger current value of $I_1$, for example, about 10 amps for a 10 amp charger. As previously mentioned, for the most accurate phase control, the phase angle controller 30 must be operated in synchronization with the zero crossings of the AC signal from the power source 22. Referring to FIG. 5, the clock 42 detects the zero crossings 504 of the waveform 502 and provides clock pulses 506 in response to each zero crossing 504. When charge current is initially turned on, the current control 34 within the microcontroller 50 provides a phase angle to the phase angle controller 30; and the triac 26 is turned on for a relatively short period of time, thereby providing a minimal charge current from the power supply 24. The current regulation process executed by the current control 34 within the microcontroller 50 is illustrated in FIG. 6. The triac 26 is cycled on and off at 120 Hz for a period of 100 milliseconds ("ms"); and during that period, the battery current and voltage are sampled at the same 120 Hz rate. The battery voltage and current are also compared to their respective $V_{SENSE}$ and $I_{SENSE}$ values. After each 100 ms period, the current control 34 uses the current comparison to provide a new phase angle to the phase angle controller 30 that will result in the battery current moving closer to the desired $I_{SENSE}$ value, The phase angle controller 30 then turns the triac 26 on in accordance with the new phase angle. Upon initially turning the battery charger on, the current control provides a relatively small charge current; and the current regulation routine of FIG. 6 gradually increases the charger current to the desired $I_{SENSE}$ value. This gradual or soft start is executed each time the current regulation process is initiated. Each time the current regulation process of FIG. 6 is turned on, it runs continuously until it is terminated by the microcontroller 50.

Figure 7:
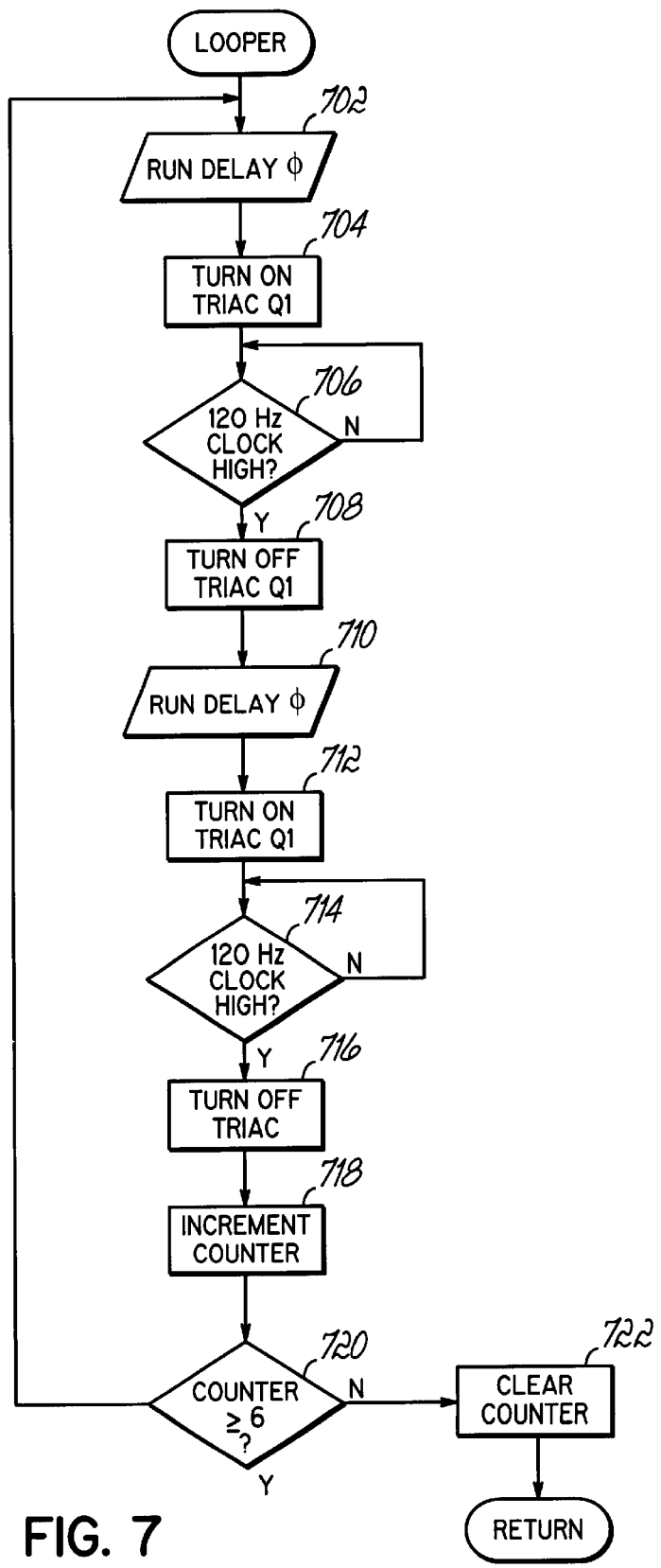
FIG. 7 is a flowchart illustrating a looper subroutine within the overall battery charging process implemented by the battery charger of FIG. 1.

Referring to FIG. 6, at 602, the current regulation process first calls or runs a looper subroutine illustrated in FIG. 7. The looper subroutine of FIG. 7 operates the triac 26 and samples the battery current and voltage during a 100 ms period. The looper subroutine of FIG. 7 is executed over six cycles of the 60 Hz AC signal from the power source 22, thereby providing its 100 ms duration. The looper subroutine first, at 702, calls or runs a delay phase subroutine illustrated in FIG. 8. The delay subroutine first, at 802, initiates a time delay 514 (FIG. 5). The time delay is determined by the microcontroller 50 and is used to turn on the triac 26 at the desired phase angle. When the time delay expires, the microcontroller, at 804, tests whether the comparator 64 (FIG. 2A) is in a state indicating that the battery current is greater than the current reference $I_{SENSE}$. Referring to FIG. 2B, the voltage across current sensing resistor 60 is amplified by amplifier 62 and integrated by a resistor capacitor network 63. Thus, a DC level representing an average magnitude of the charge current is provided to the comparator 64 of FIG. 2A. If the comparator 64 has switched states indicating that the charge current is equal to or greater than the current reference, a current flag is set at 806. If not, the microcontroller 50 then determines, at 808, whether the output from comparator 78 (FIG. 2B) has a state indicating that the battery voltage exceeds the current voltage reference value on input 80. If so, the microcontroller sets a voltage flag at 810 and then returns to the looper subroutine of FIG. 7.

Referring to FIG. 5, the charge current output from the secondary winding of the transformer 46 is illustrated by the waveform 518. It should be noted that the battery voltage is measured immediately prior to the rising leading edges 508 of waveform 510; and that at that time, the transformer output current 518 is substantially equal to zero as indicated at 520. Thus, when the voltage of the battery 28 is measured, there is no charge current being provided by the battery charger 20. Consequently, when the battery voltage is measured, there are no voltage drops across the impedances of the battery charger lead wires or the connections of those lead wires to the battery 28. Thus, the sensing of the battery voltage by the voltage sensor and monitor 38 under a substantially zero current condition is very accurate and does not require any compensation.

The looper subroutine proceeds, at 704, to turn the triac 26 on. Referring to FIG. 5, a leading edge 508 of waveform 510 indicates the beginning of the triac on-time. Next, the looper subroutine of FIG. 7 determines, at 706, whether a pulse from the clock 42 has gone high. When that happens, the looper subroutine, at 708, then proceeds to turn the triac 26 off as indicated by the trailing edge 512 of the waveform 510. Once again, at 710, the microcontroller 50 calls or runs the delay subroutine of FIG. 8 as described above. The triac is turned on at 712, a subsequent clock pulse from the clock 42 is sensed at 714, and the triac is again turned off at 716. Thereafter, an internal counter is incremented at 718 and a test is made at 720 to determine whether the counter has counted to six, that is, six cycles of the AC waveform. If not, the looper subroutine of FIG. 7 is repeated until the counter has accumulated the number six and thereafter, at 722, the counter is cleared; and the process returns to the current regulation subroutine of FIG. 6.

Referring to FIG. 6, the current control 34 within the microcontroller 50 first, at 603, increments a tenths timer register. That register together with other timer registers function as the charge timer 44 (FIG. 1) that keeps track of the elapsed time of a charge mode. Then, at 604, the current control 34 within the microcontroller 50 determines whether the current flag was set indicating that the charge current equals the current reference $I_{SENSE}$. If the battery charger has just been turned on, the initial charge current is a minimal value; and therefore, the current flag will not have been set. Next, the current control 34 determines whether the current value of the phase angle is less than a minimum value. If not, the phase angle is decremented at 608. Decrementing the phase angle also reduces the length of the time delay 514 (FIG. 5) measured at 802 in FIG. 8, thereby increasing the on-time 515 of the triac 26. Increasing the on-time 515 increases the magnitude of the charge current provided to the battery 28. The process steps 602–604 of the current regulation subroutine are repeated thus incrementally changing the magnitude of the charge current until it is equal to or exceeds the current reference $I_{SENSE}$. If that state is detected, at 604, the current control 34 within the microcontroller 50 increments the phase angle at 610, thereby increasing the off-time 514 and decreasing the on-time 515 of the triac 26. The process of current regulation continues as described with respect to FIGS. 6–8 throughout the various charge modes described herein.

The subroutine of FIG. 6 also detects excessive limits of the phase angle. For example, if the phase angle drops below a minimum, as detected at 606, the current control 34, at 612, 618 shifts the phase angle to its full value and no phase angle control is used. Similarly, if the subroutine detects, at 614, that the phase angle exceeds a maximum value, a turn off subroutine 616 is executed in which the triac 26 is turned off and the LED R1 is flashed on and off. That subroutine 616 continues to run until the AC power is cycled off and on.

Figure 8:
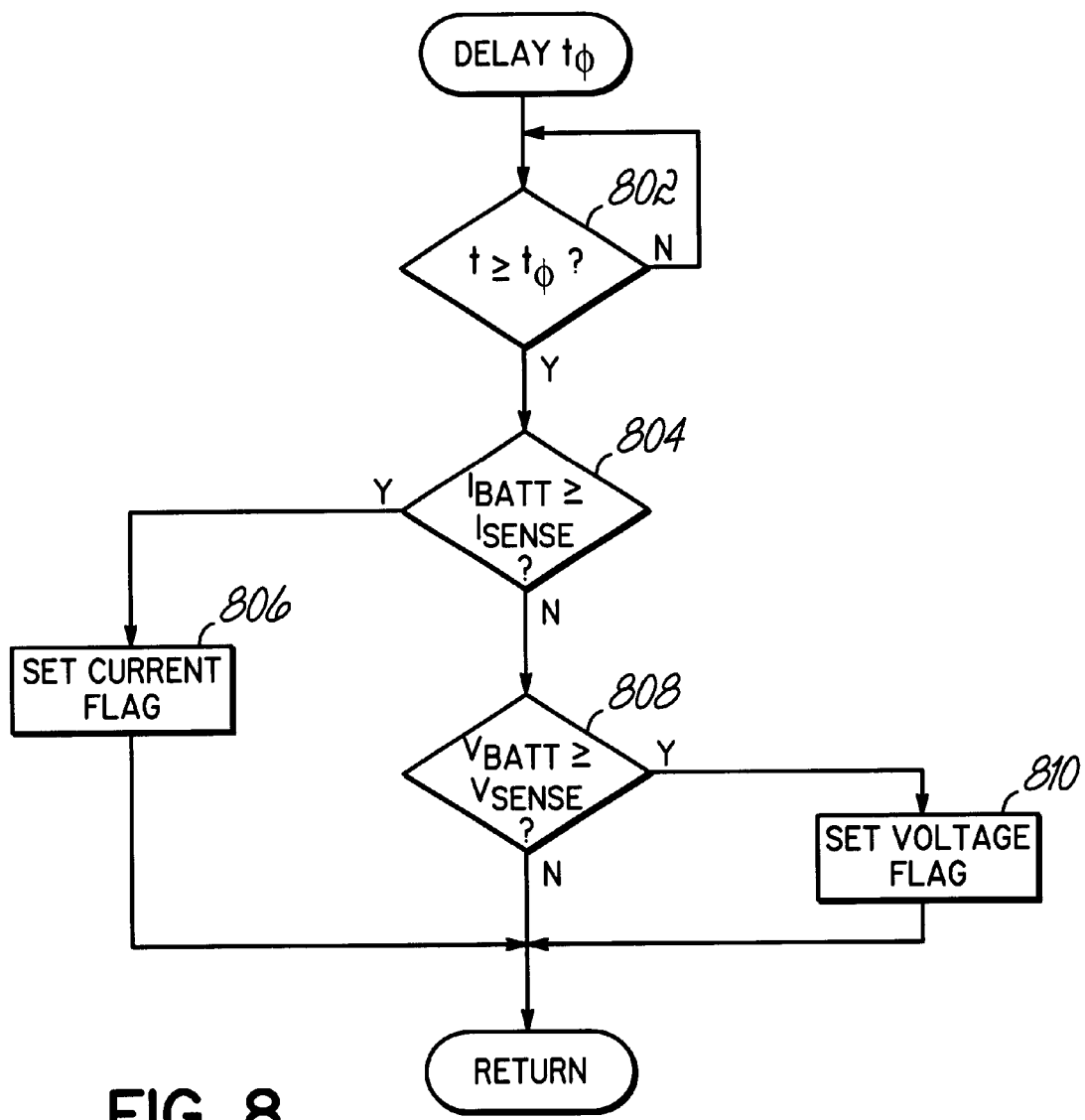
FIG. 8 is a flowchart illustrating a delay subroutine within the overall battery charging process implemented by the battery charger of FIG. 1.
Figure 9:
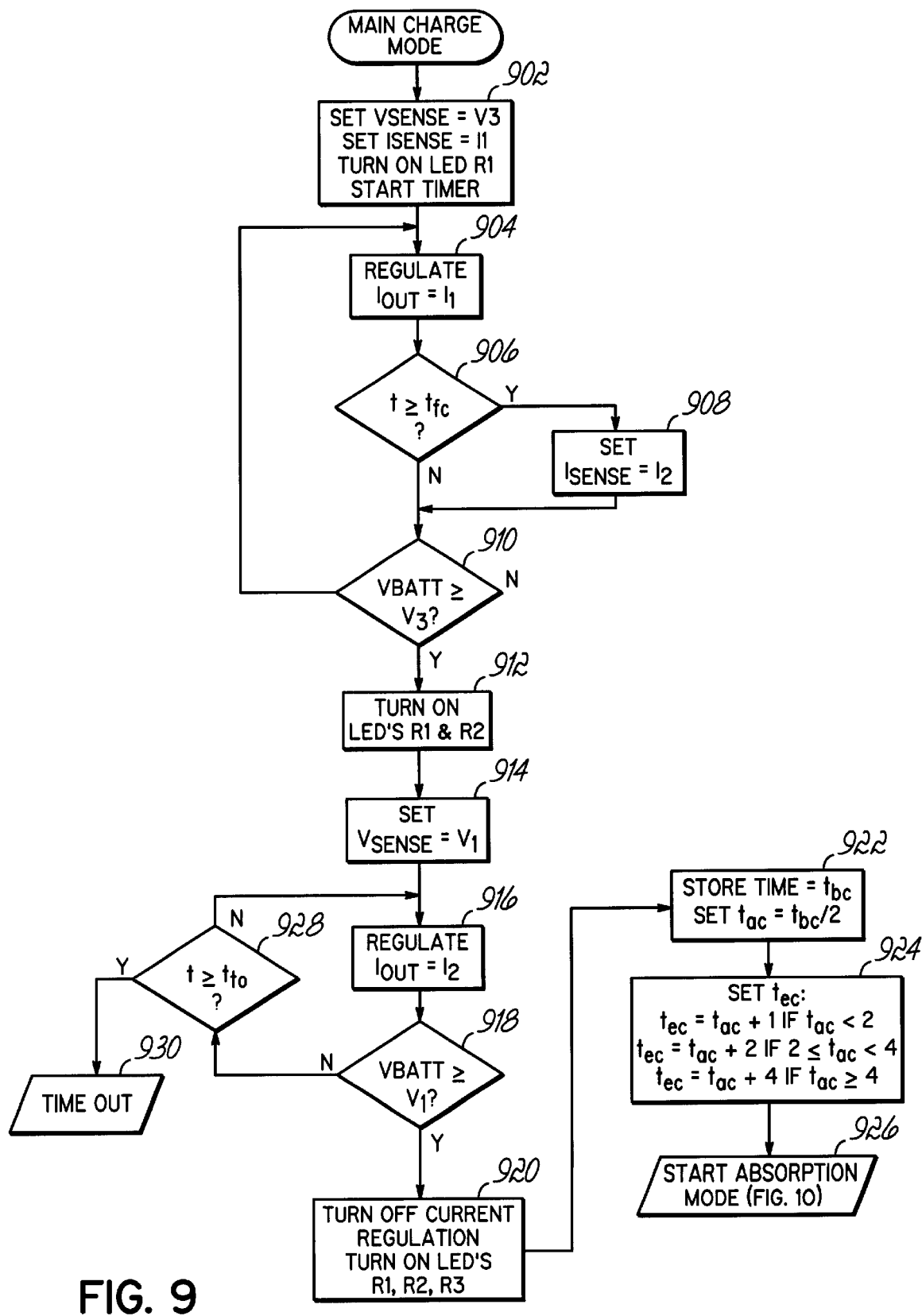
FIG. 9 is a flowchart illustrating a main charge mode within the overall battery charging process implemented by the battery charger of FIG. 1.

Referring again to the evaluation mode of FIG. 4, if during the evaluation mode, a normal discharge condition exists, a main charge mode subroutine is called or run at 416. Referring to FIG. 3A, the main charge mode is comprised of an initial, fixed duration, fast charge mode 302 and a variable time, voltage dependent, bulk charge mode 304. Referring to FIG. 9, to initiate the fast charge mode, the microcontroller 50, at 902, first sets the voltage reference $V_{SENSE}$ on input 80 of comparator 78 to $V_3$, for example, 13.5 V with a 10 amp charger. The current reference $I_{SENSE}$ is maintained at $I_1$, and the LED $R_1$ is turned on to indicate an approximate 25% charge and the start of the fast charge mode. In addition, the internal timer 44 is reset and started. Thereafter, at 904, the current regulation subroutine described with respect to FIGS. 6–8 is started to regulate the charge current to the current reference of $I_1$. The fast charge mode continues until the charge timer 44 counts an elapsed time $t_{FC}$, for example, about 30 minutes, which is detected at 906. At this point, the fast charge mode ends and the battery charger 20 is automatically switched to the bulk charge mode charge indicated at 304 of FIG. 3A.

Figure 3B:
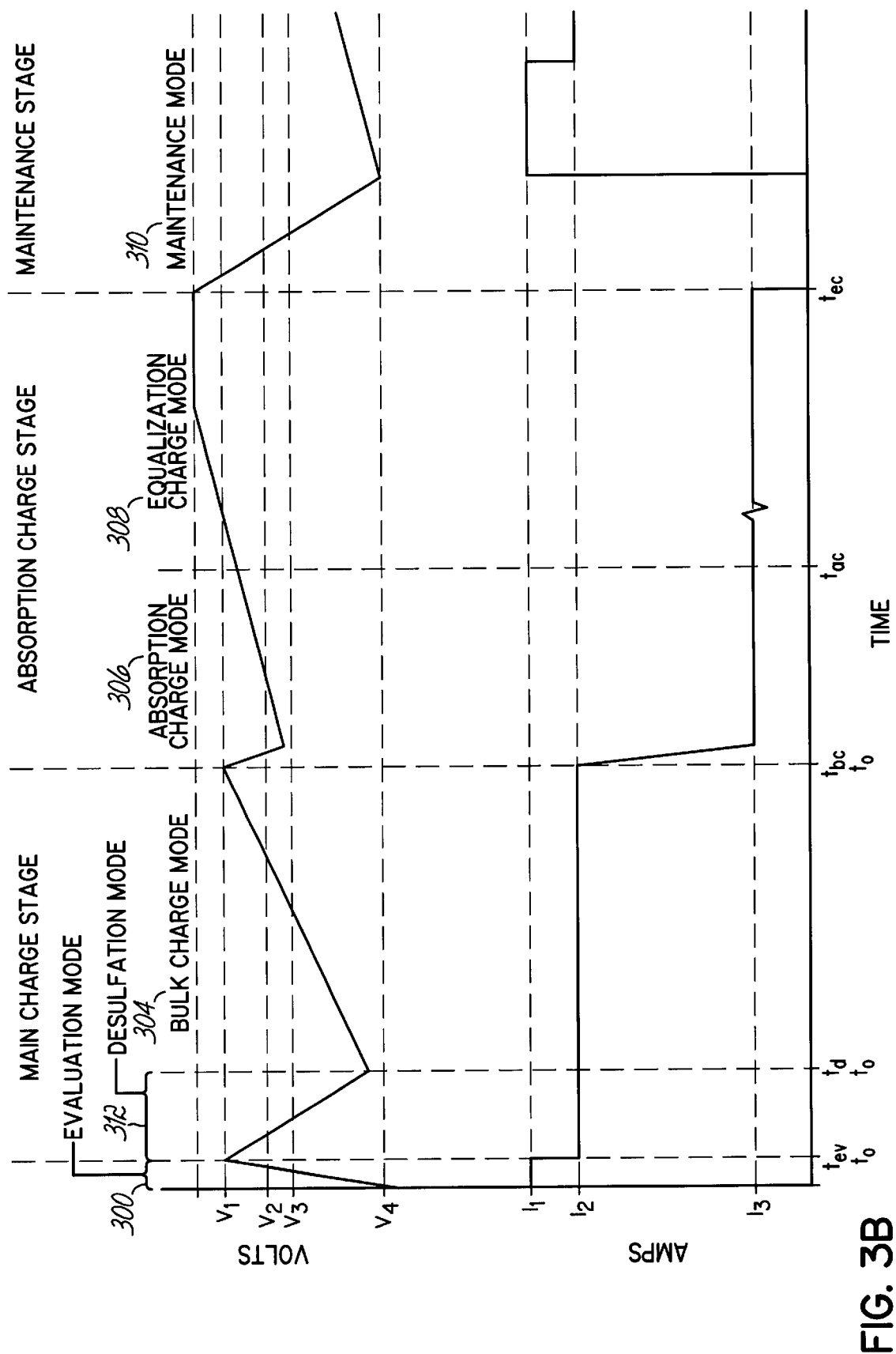

To initiate the bulk charge mode, the microcontroller 50, at 908, sets the reference current $I_{SENSE}$ to a lower level of $I_2$, for example, about 7.5 amps with a 10 amp charger. The battery charger continues in the bulk charge mode until the microcontroller detects, at 910, the voltage flag is set indicating the battery voltage has reached the reference voltage $V_3$. Thereafter, at 912, the microcontroller 50 indicates an approximate 50% charge of the battery and/or the start of the bulk charge mode by illuminating the red LEDs R1 and R2. It should be noted that the flowchart depictions of the operation of the battery charger 20 are exact representations of the battery charger operation. For example, normally, the charge mode control 32 tests whether the battery voltage achieves the reference voltage $V_3$ during both the fast charge and bulk charge modes. Therefore, the red LEDs R1 and R2 may be illuminated during either charge mode. At 914, the voltage reference $V_{SENSE}$ is switched to $V_1$, for example, about 14.8 V for a 10 amp battery charger. The bulk charge mode continues with the current regulation, at 916, to the $I_2$ level until, at 918, the charge mode control 32 within the microcontroller 50 detects that the voltage flag has been set (810 of FIG. 8), indicating that the battery voltage is equal to or greater than the voltage reference $V_1$. Thereafter, at 920, the current regulation is turned off; and all three red LEDs R1, R2, R3 are illuminated to indicate a 75% charge on the battery and/or the beginning of the absorption charge mode 306 (FIG. 3).

Upon the battery voltage achieving the voltage reference $V_1$, the microcontroller 50 is then able to calculate the time durations of the absorption charge mode 306 (FIG. 3A) and the equalization charge mode 308 of the absorption stage. Upon the battery voltage achieving the $V_1$ reference level, the microcontroller 50, at 922, stores as $t_{BC}$ the elapsed time from the start of the main charge mode which is currently registered by the charge timer 44. A further time $t_{AC}$ representing a desired duration of the absorption charge mode is calculated to be equal to about one-half of the $t_{BC}$ time, and that time is also stored. In addition, the microcontroller 50 also calculates, at 924, the time duration of an equalization charge mode 308. Thereafter, at 926, the charge mode control 32 within the microcontroller 50 calls or runs the absorption charge mode subroutine.

If the battery is not accepting a charge, then at 918, the battery voltage will not rise to the voltage reference $V_1$, and the battery charger 20 will stay in the bulk charge mode for an extended period of time. The microcontroller 50, at 928, determines if the charge timer 44 has stayed on for that extended period of time, for example, 18 hours. If it has, the microcontroller 50 then, at 930, turns off the current regulation by turning off the triac 26 and also, turns off or electrically disconnects the charger 20 by turning off the relay 98. In addition, the red LEDs R1 and R2 are turned off, and the green LED G1 flashes or blinks to indicate a charge error. The battery charger 20 stays in this mode until the AC power is cycled on and off.

Figure 10:
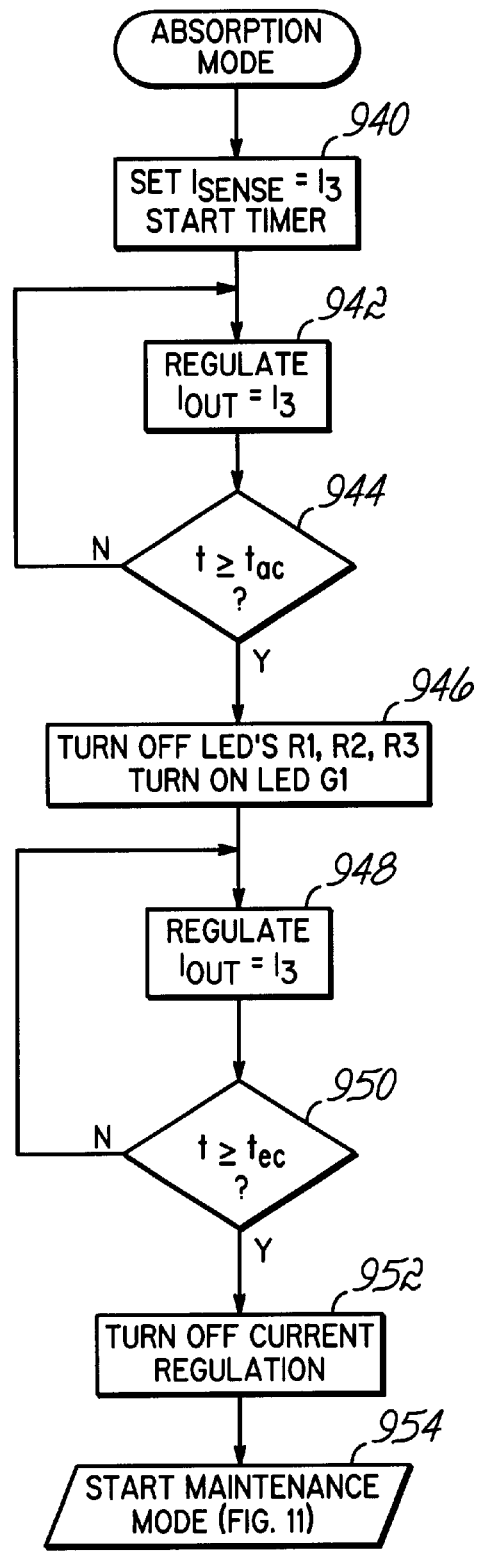
FIG. 10 is a flowchart illustrating an absorption charge mode within the overall battery charging process implemented by the battery charger of FIG. 1.

Assuming that the battery is accepting a charge and the battery voltage achieves the voltage reference $V_1$, the charge mode control 32 within the microcontroller 50 automatically initiates the absorption charge mode routine of FIG. 10 that includes the equalization charge mode. An important feature of the battery charger 20 is that the microcontroller 50, at 922 of FIG. 9, automatically sets a variable time or period for the absorption charge mode as a function of the state of discharge of the battery 20. With a more deeply discharged battery, more time will be required in the bulk charge mode for the battery voltage to achieve the voltage reference $V_1$, and normally, a longer absorption charge time is desirable. The microprocessor 50 sets the absorption charge time to be one-half of the measured bulk charge time; and hence, the absorption charge time is established generally as a function of the state of discharge of the battery 28.

In the absorption charge mode, the microcontroller 50 first, at 940, sets the current reference to a lower value $I_3$, for example, about 2 amps for a 10 amp charger; and the charge timer 44 is reset and started. Thereafter, at 942, the current is regulated as described with respect to FIGS. 6–8 so that the charge current is maintained about equal to the current reference $I_3$. Next, the microcontroller 50 determines, at 944, whether the time period for the absorption stage is ended. If not, the current is maintained at the lower $I_3$ level; and the battery voltage normally continues to rise generally steadily as indicated by the absorption charge mode 306 of FIG. 3A. When the charge timer 44 measures a time period equal to the stored time $t_{AC}$, the microcontroller 50 then indicates a fully charged battery by turning off the red LEDs R1, R2, R3 and turning on the green LED G1 at 946. However, that does not represent the end of the battery charger cycle.

Generally, the voltage of lead acid battery cells needs to be charged above their nominal voltage values in order to equalize the voltages on all of the cells of the battery 28. For example, for a nominal 12V lead acid battery, during an overcharge period, the terminal voltage may reach about 15–15.5 VDC/at 25° C. When the battery reaches that level of charge, the electrolyte bubbles of hydrogen and oxygen are produced or outgassed in the charging process. This action aids in removing stubborn sulfate particles from the plates as well as equalizing the cell voltages. Thus, after the battery is initially fully charged, the battery charger provides a further equalization charge period as indicated at 308 of FIG. 3A.

Another important feature of the present invention is that first, the equalization charge current is a relatively low current, for example, about 2 amps for a 10 amp charger. Such a low current prevents an overcharge condition that results in excessive outgassing and an excessive loss of electrolyte. Second, the equalization charge period is a variable time that is automatically set by the microcontroller 50 as a function of the degree of discharge of the battery. The following differences have been observed between lesser discharged batteries and batteries that are more deeply discharged. With lesser discharged batteries, the elapsed time of the absorption charge mode is less; and during the equalization charge mode, it takes less time for the battery to achieve a 15 V charge to initiate a more aggressive removal of stubborn sulfate particles from the plates. Hence, one can reasonably conclude that a longer equalization time is required for more deeply discharged batteries. At 924 of FIG. 9, the microcontroller 50 automatically establishes variable time periods for the equalization charge mode that are directly proportional to the elapsed times of respective absorption charge modes. For example, if the absorption charge time is less than two hours, the equalization charge time period is set for one hour; and if the absorption charge time is greater than four hours, the equalization charge time period is set for 4 hours.

Referring back to FIG. 10, during the equalization charge mode, the current continues to be regulated to the lower reference $I_3$ as indicated at 948. When the charge timer measures an elapsed time equal to the stored time of the equalization charge mode $t_{EC}$, that time is detected by the microcontroller at 950. Thereafter, at 952, the charge mode control 32 causes the current control 34 to turn off the current regulation by turning off the power switch 26, thereby terminating the charge current from the battery charger 20.

Figure 11:
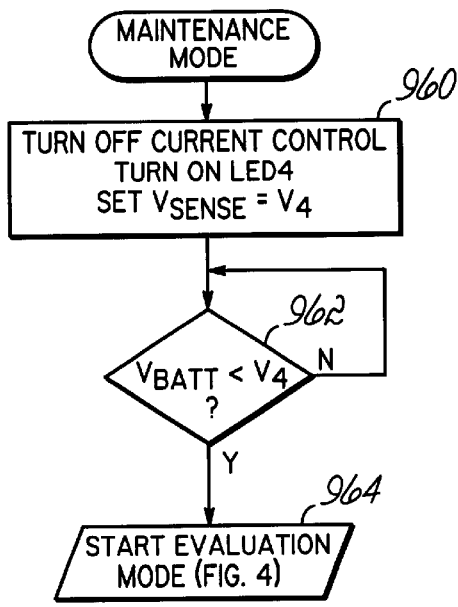
FIG. 11 is a flowchart illustrating a maintenance stage within the overall battery charging process implemented by the battery charger of FIG. 1.

Thereafter, the charge mode control 32 within the microcontroller 50 calls, at 954, a maintenance stage subroutine as illustrated in FIG. 11. During the maintenance stage, the microcontroller 50 first, at 960, changes the reference voltage $V_{SENSE}$ to a lower level $V_4$, for example, about 12.6 V for a 10 amp charger. Further, the green LED G1 continues to be illuminated indicating a fully charged battery. The battery charger stays in that mode until the battery voltage drops to the $V_4$ level, as detected at 962; and the charge mode control 32 then, at 964, automatically calls or runs the evaluation mode subroutine illustrated in FIG. 4. The evaluation mode and battery charging process is then repeated.

Referring to FIG. 4, if an initial low battery voltage $V_4$ is detected, at 404, and then subsequently, during the evaluation mode, the battery voltage is detected to rise to a higher level $V_2$, at 410, the charge mode control 32 within the microcontroller 50 determines that the battery contains stubborn lead sulfate deposits that normally will not be removed during the battery charge cycle illustrated in FIG. 3A. The charge mode control 32 then executes a desulfation charge mode as indicated at 312 in FIG. 3B. The desulfation charge mode is run at the beginning of the main charge stage in place of the fast charge mode of FIG. 3A. That is the only difference between the battery charging cycles of FIGS. 3A and 3B. Batteries that have been discharged and allowed to remain in that condition for extended periods of time or, batteries that have not been fully recharged, tend to accumulate lead sulfate on the plates of the batteries that are more difficult to remove. This condition is worsened by low water levels in the battery as well. When the batteries are discharged, a chemical reaction takes place in which some of the acid combines with the lead plates to form lead sulfate. This reduces the plate surface area and lowers the specific gravity of the electrolyte as well as battery capacity. Recharging the batteries causes the sulfate to dissolve, increasing plate surface area and electrolyte specific gravity which increases battery capacity. All or most of the sulfate should be removed from the plates during the battery charging process. When a battery that has a high internal impedance and low capacity is connected to a charger, the initial voltage present at the battery terminals is low.

Figure 12:
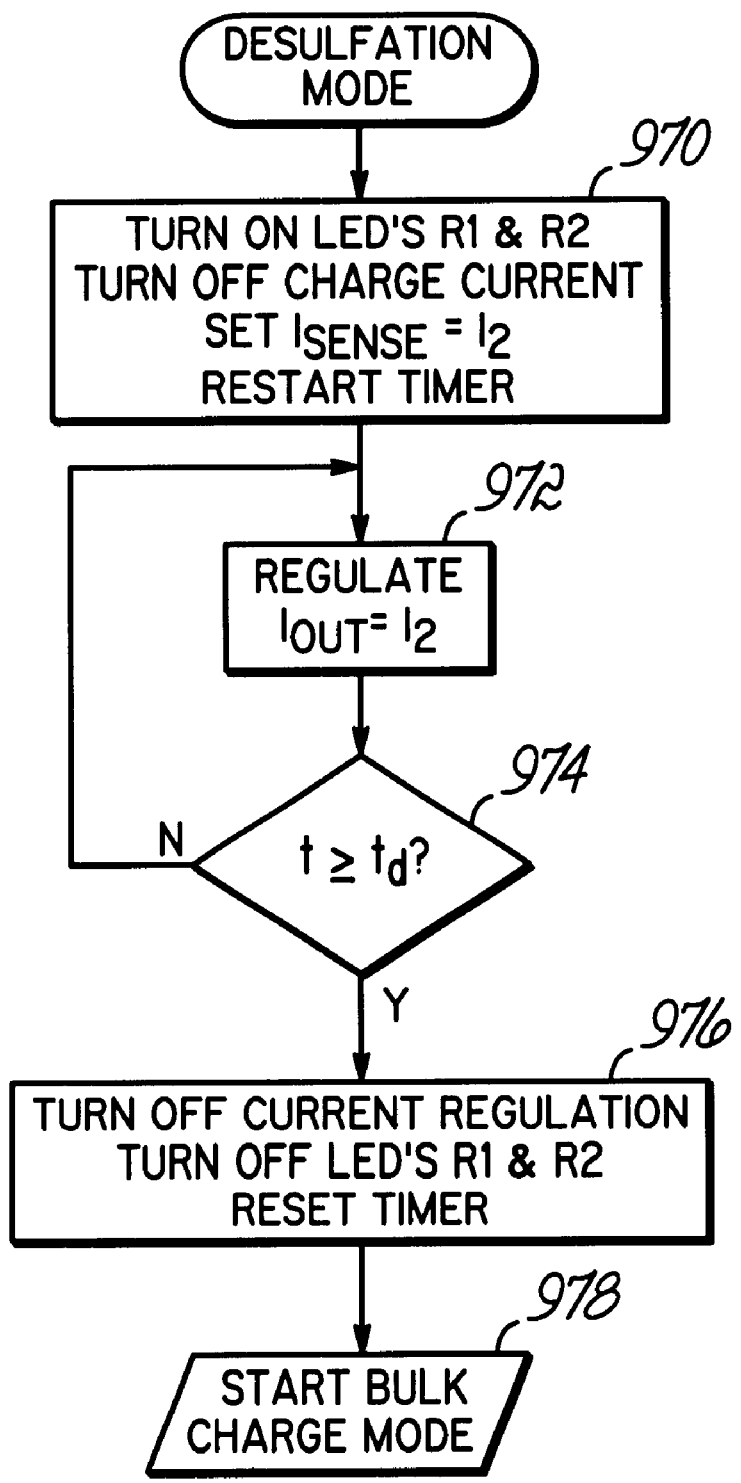
FIG. 12 is a flowchart illustrating a desulfation charge mode within the overall battery charging process implemented by the battery charger of FIG. 1.

Applying current to the battery causes the voltage at the terminals to rapidly increase due to the added voltage drop across the higher internal impedance. If the voltage rises to a level in the evaluation mode indicating a fully charged battery, the charger is tricked into turning off. The evaluation mode of FIG. 4 looks at the battery voltage, at 404, prior to applying a charge current as well as, at 410, after the application of a large charge current. The charge mode control 32 within the microcontroller 50 detects when a battery voltage rises from a low value, for example, $V_4$ or 12.6 V, to a relatively high value, for example, $V_2$ or 13.8 V, during the one minute evaluation mode. The charge mode controller 32 attributes such a rapid rise in battery voltage to a sulfate build up on the battery plates and therefore, automatically runs the desulfation charge mode subroutine of FIG. 12. The microcontroller first, at 970, turns off the power switch 26, sets the current reference to the intermediate value $I_2$, for example, about 7.5 amps for a 10 amp charger, and resets and restarts the charge timer 44. Thereafter, at 972, the charge current is regulated to the $I_2$ value until, at 974, the microcontroller detects the end of the desulfation charge mode. The desulfation charge mode normally has a duration of about two hours. Thereafter, at 976, the microcontroller again turns off the current regulation by turning off power switch 26, turns off the red LEDs R1 and R2 and resets the charge timer 44. The battery charge cycle then, at 978, automatically calls the bulk charge mode subroutine starting at step 912 of FIG. 9.

Referring to FIG. 2B, the battery charger 20 has one further feature that is valuable in many applications. In marine applications, for example, the battery charger 20 is normally located below deck or in some other enclosed area adjacent the battery. Hence, the LEDs R1, R2, R3, G1 on the battery charger 20 are difficult to access and read. To resolve that situation, the battery charger 20 has an optional remote LED module 106. The remote LED module may be placed or mounted at any location that is convenient to the user. The module 106 includes a microcontroller 110 that illuminates a second set of LEDs RR1, RR2, RR3, GG1 so that they match the operation of LEDs R1, R2, R3, G1 on the battery charger 20.

In order for the remote LED module 106 to duplicate the operation of the LEDs on the battery charger 20, the desired operating state of each of the LEDs must be transmitted from the microcontroller 50 within the battery charger 20 to the microcontroller 110 in the remote module 106. One option is to provide a communications link between the microcontrollers 150, 110 and transmit the desired states of the LEDs therebetween using transceivers or other devices. An alternative embodiment is illustrated in FIGS. 1 and 2, the remote module 106 is connected to the outputs 86, 87 of the battery charger 20. Thus, the circuitry of the battery charger 20 is used as a communications link between the microcontrollers 150, 110. With each current pulse provided from the battery charger 20, the battery voltage simultaneously rises a small amount, and during the time between current pulses, the battery voltage falls a small amount. Thus, the charge current pulses impose a ripple-like waveform on the battery charger output. The amplifier 108 is responsive to that ripple-like waveform and produces a square wave signal corresponding a series of the charge current pulses.

Figure 13:
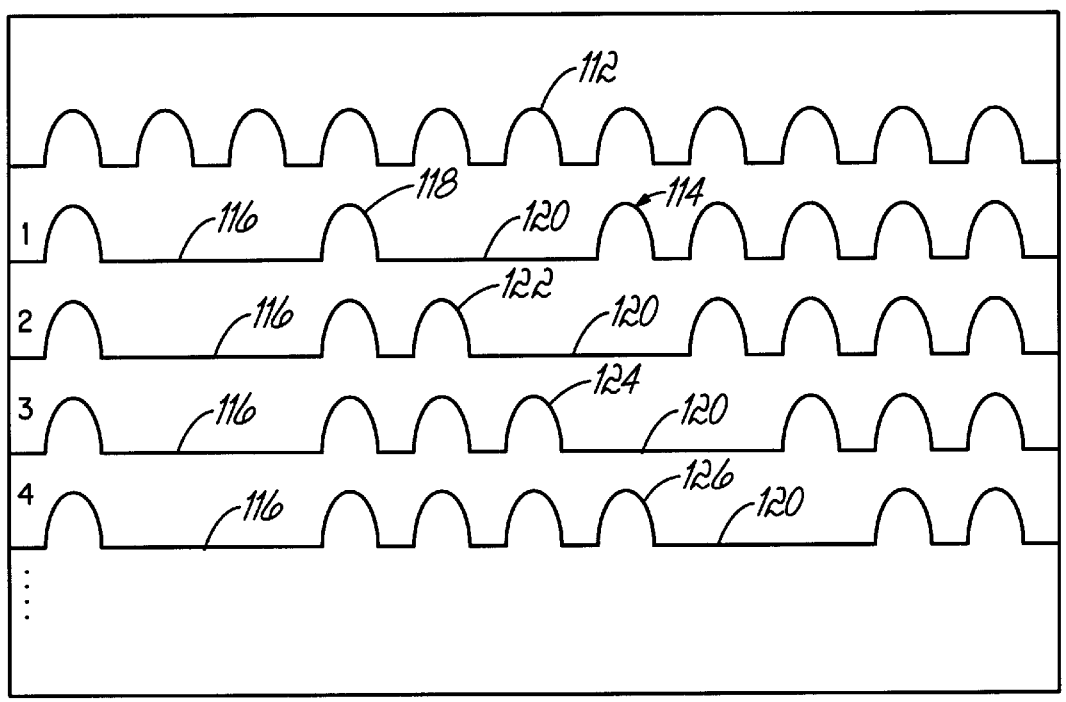
FIG. 13 is a flowchart illustrating a process by which signal states are transmitted to a remote module implemented with the battery charger of FIG. 1.

Further, the charge current pulses from the power supply 24 can be encoded to represent different operating states of the LEDs in the module 106. On a periodic basis, for example, once every several minutes, the microcontroller 50 can omit one or more of the current pulses in accordance with a predetermined pattern or code. Referring to FIG. 13, the waveform 112 represents a normal series of charge current pulses from the battery charger 20. The waveform 114 has a pulse code start portion 116 in which two charge current pulses are omitted to represent a start of a data or information portion of the pulse code. The pulse code start portion 116 is followed by a data portion of the pulse code represented by a current pulse 118. Thereafter, a pulse code end portion 120 uses an absence of two charge current pulses to signal a termination of the pulse code. As shown by the data portions 122–126, the presence of different numbers of charge current pulses are interpreted as different codes corresponding to different operating states of the LEDs RR1, RR2, RR3, GG1 in the remote module 106.

Since the charge current pulses are normally continuous and predictable at 120 Hz, the microcontroller 110 is able to detect the absence of expected charge current pulses and to decode the start and end portions 116, 120, respectively. In addition, the microcontroller 110 detects and decodes an intermediate presence of charge current pulses in the data portion 118 to initiate operating states of the LEDs RR1, RR2, RR3, GG1 so that they match the operating states of the LEDs R1, R2, R3, G1. The transmission of the states of the LEDs by the microcontroller 50 to the microcontroller 110 is performed often enough to appropriately illuminate the LEDs on the remote module 106 but not so often as to adversely impact the charge time of the battery 28.

Referring to FIG. 14, the microcontroller 50 executes a subroutine to continuously update the remote LED module 106. The microcontroller 50 first determines, at 202, whether the remote update timer has expired. The timing period of the remote update timer determines how often the LEDs on the remote module 106 are to be updated. If it has expired or timed out, the current states of the LED registers are read, at 204; and the microcontroller 50 then, at 206, creates pulse codes, for example, as illustrated in FIG. 13, that correspond to the current operating states of the LEDs R1, R2, R3, G1. Thereafter, the microcontroller 50, at 208, modifies the operation of the looper routine to inhibit the normal operation of the triac 26, thereby selectively omitting the production of charge current pulses by the power supply 24 in accordance with the pulse codes. The microcontroller 50 then, at 210, resets and starts the remote update timer. Modifying the operation of the triac 26 results in an absence of charge current pulses to the battery 28 that would normally be expected.

Referring to FIG. 15, the microcontroller 110 continuously executes a subroutine that first, at 250, checks for an absence of expected current pulses, for example, an absence of two charge current pulses representing a pulse code start as shown by waveform portions 116 of FIG. 13. Upon detecting the start code, the microcontroller 110 then knows that a data portion of the pulse code is being transmitted next by the microcontroller 50. The microcontroller 110 then, at 252, receives and stores the data portion of the pulse code, for example, waveform portions 118, 122, 124, 126 of FIG. 3. Thereafter, at 254, the microcontroller 110 checks for another absence of expected charge current pulses, for example, an absence of two charge current pulses representing a pulse code end as shown by waveform portions 120 of FIG. 13. The microcontroller 110 thereafter, at 256, decodes the data portion of the pulse code. Each data portion normally refers to one operating state of an LED; and therefore, a series of pulse codes is required to represent all of the operating states of the LEDs RR1, RR2, RR3 and GG1 on the remote module 106. Further, operating codes are also used to command different operating states, for example, a continuous on state, a blinking state or a flashing state with another LED. Any errors detected in the operation of the battery charger 20 are normally indicated to the user by flashing one or more of the LEDs. Thus, by applying a pulse code to the charge current pulses, the operation of the remote LEDs RR1, RR2, RR3, GG1 is made to match the operation of the LEDs R1, R2, R3, G1 on the battery charger 20. As will be appreciated, the illustrated encoding scheme of FIG. 13 is only one example of an encoding scheme for transmitting data to the remote module 106 using the charge current pulses. Many other schemes may be derived relating to the absence and presence of charge current pulses.

The battery charger 20 described above has many beneficial features and advantages. For example, with respect to the overall battery charge cycle, the microcontroller 50 automatically sets an equalization charge time that is a function of the degree of discharge of the battery. The microcontroller 50 establishes variable equalization charge times that are directly proportional to respective absorption charge times. By fully charging all batteries independent of the state of discharge, the battery charger 20 has the advantage of always providing the user with a battery that will have the longest possible service life. Further, it's service life is not diminished by undercharging or overcharging.

Another beneficial feature of the present invention is that the battery charger 20 described herein automatically initially detects deeply discharged batteries and provides an initial desulfation cycle. Once again, the battery charger 20 has an advantage of consistently providing to the user batteries that have been completely and fully charged independent of the initial state of discharge.

The battery charger 20 described herein has further advantages as well. For example, the battery voltage is measured at zero charge current so that a very accurate sampling of battery voltage is obtained. Further, in measuring battery voltage, the voltage reference is compensated for changes in battery temperature continuously in real time. Thus, the battery voltage sampled more accurately reflects the true battery voltage with the advantage of providing more consistently charged batteries under different environmental conditions. Further, the switching device 26 is placed on the primary side of the transformer 46 with the advantage of making the design of the battery charger 20 more efficient and cost effective.

The battery charger 20 described herein is of particular value in charging batteries intended for use in marine applications. The battery charger 20 automatically provides variable charge modes as a function of the state of discharge of the battery. Therefore, at the end of the battery charge cycle, the user consistently has a battery that has been fully charged independent of its starting state of discharge and without causing damage to, or reducing the life of, the battery. Thus, the user is always using a battery that has the longest possible life between charges, thereby minimizing unwanted interruptions to the user's activities and the consequences thereof. Thus, if the battery is being used by a fisherman in competition, the more reliable battery charge provided by the battery charger 20 maximizes the probability that the fisherman can complete a day-long competition without losing the use of the trolling motor or electronics due to weak or completely discharged batteries. Further, by avoiding overcharging during the equalization charge mode, the life of the battery is optimized.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, the battery 28 is identified as a wet cell or flooded lead acid battery. While the battery charger 20 described herein is very effective in charging a flooded lead acid battery, the battery charger 20 may prove effective with other types of lead acid batteries.

Further, in the described embodiment, the battery charger 20 is described as being connected to a single battery 28. With some applications, multiple batteries may be present; and the described battery charger 20 may be used to successively charge those batteries. However, as will be appreciated, multiple modules, each comprised of a battery charger 20, may be disposed in a common housing; and those multiple battery chargers used to simultaneously charge a like number of batteries.

The battery charger 20 is described herein as being a 10 amp charger; however, as will be appreciated the claimed inventions are applicable to other capacity battery chargers, for example, 5 amp, 7 amp, etc. Further, such battery chargers will utilize slightly different charging cycles. For example, referring to FIG. 3A, with a 5 amp or 7 amp charger, the 10 amp charge current during the evaluation mode is reduced to 7 amps at the beginning of the fast charge mode. Further, the charge current is reduced again to 5 amps during the bulk charge mode. Thus, with different capacity chargers and with batteries having different nominal voltages, the magnitudes of the current and voltage references will differ; and in addition, the time periods of the various charge modes will often also vary. However, such variations in the charge cycle specifications are expected when battery chargers of different current capacities are used.

Therefore, the invention in its broadest aspects is not limited to the specific details shown and described. Consequently, departures may be made from the details described herein without departing from the spirit and scope of the claims which follow.

What is claimed is:

1. A battery charger for a lead acid battery comprising:
   a power supply having an input adapted to be connected to an AC signal and an output adapted to be connected to the battery, the power supply providing a charge current to the battery;
   a clock having an input adapted to be connected to the AC signal and providing output clock pulses having transitions synchronized with zero crossings of the AC signal;
   a voltage monitor adapted to be connected to the battery for detecting a battery voltage substantially simultaneously with a zero value of the charge current and providing a battery voltage related signal; and
   a charge mode control electrically connected to the voltage monitor and responsive to the clock pulses and the battery voltage related signal for commanding different battery charge currents.

2. The battery charger of claim 1 further comprising a switch operatively connected to the power supply for turning the power supply on and off to provide a series of charge current pulses, and the voltage monitor detecting the battery voltage at a time between the charge current pulses.

3. A method of charging a lead acid battery comprising:
   applying a charge current intermittently to the battery;
   detecting a battery voltage substantially simultaneously with a zero value of the charge current;
   providing a battery voltage related signal in response to detecting the battery voltage; and
   commanding different charge currents in response to the battery voltage related signal.

4. The method of claim 3 further comprising:
   applying a series to current pulses to the battery; and
   detecting the battery voltage at a time between two of the current pulses.

5. The method of claim 4 further comprising:
   creating the series of pulses applied to the battery in synchronization with zero crossings of an AC signal providing the charge current.

6. A battery charger for a lead acid battery comprising:
   a power supply having
     an input adapted to be connected to an AC signal,
     an output adapted to be connected to the battery, and
     a switch operatively connected to the power supply for turning the power supply on and off;
   a clock having an input adapted to be connected to the AC signal and providing output clock pulses having transitions synchronized with zero crossings of the AC signal;
   a phase angle controller operatively connected to the switch;
   a current monitor adapted to be connected to the battery for detecting charge current in the battery, the current monitor providing a charge current related signal;
   a current control having an input responsive to the charge current related signal and an output connected to the phase angle controller, the current control causing the phase angle controller to turn the switch on and off in synchronization with the clock pulses;
   a voltage monitor adapted to be connected to the battery for detecting a battery voltage substantially simultaneously with a zero value of the charge current and providing a battery voltage related signal; and
   a charge mode control having inputs responsive to the clock pulses and the battery voltage related signal and an output connected to the current control, whereby the charge mode control commands different charge currents as a function of the battery voltage and at least one elapsed time period.

7. The battery charger of claim 6 further comprising a temperature compensation circuit connected to a reference input of the voltage monitor, the temperature compensation circuit comprising:
   a diode having a forward voltage drop with a temperature coefficient of about −2 mv/° C. at a constant current;
   a constant current source connected to the diode; and
   an amplifier connected to the diode and having a gain of 2 to double an effect of the forward voltage drop of the diode.

8. A battery charger for a lead acid battery comprising:
   a power supply having
     an input adapted to be connected to an AC signal,
     an output adapted to be connected to the battery, and
     a switch disposed between the input and the AC signal for turning the power supply on and off;
   a clock having an input adapted to be connected to the AC signal and providing output clock pulses having transitions synchronized with zero crossings of the AC signal;
   a voltage monitor adapted to be connected to the battery, the voltage monitor detecting a battery voltage and providing a battery voltage related signal; and
   a charge mode control responsive to the battery voltage related signal for commanding different battery charge currents.

9. The battery charger of claim 8 wherein the power supply further comprises a transformer having primary and secondary winding and the switch being disposed between the AC signal and the primary winding of the power supply.

10. A battery charger for a lead acid battery comprising:
 a power supply having an input adapted to be connected to an AC signal and an output adapted to be connected to the battery, the power supply providing a charge current to the battery;
 a voltage monitor having a first input and a second input adapted to be electrically connected to the battery, the voltage monitor providing a battery voltage related signal;
 a voltage divider circuit electrically connected between the battery and the second input of the voltage monitor, the voltage divider dividing the battery voltage to provide a voltage on the second input representing the voltage of a battery cell;
 a temperature compensation circuit comprising
  a diode located proximate the battery and having a forward voltage drop with a temperature coefficient of about −2 mv/° C. at a constant current, and
  a multiplier connected between the diode and the first input of the voltage monitor and providing a temperature compensated signal with a temperature coefficient of about −4 mv/° C.; and
 a charge mode control responsive to the battery voltage related signal for commanding different battery charge currents.

11. The battery charger of claim 10 wherein the multiplier further comprises:
 a constant current source connected to the diode; and
 an amplifier connected to the diode and having a gain of 2 to double an effect of the forward voltage drop of the diode.

12. A method of charging a lead acid battery comprising:
 applying a main charge current to the battery for a first time period terminating upon a battery voltage rising to a first magnitude; and
 applying, after the first time period, an absorption charge current to the battery for a second time period determined as a function of a time elapsing from an application of the main charge current until the battery voltage rises to the first magnitude.

13. The method of claim 12 further comprising determining the second time period to be equal to about one-half of the first time period.

14. The method of claim 13 further comprising:
 applying a first current to the battery for a first, predetermined time period;
 applying, after the first time period, a second current to the battery for a second time period terminating upon a battery voltage rising to a first magnitude; and
 applying, after the second time period, a third current to the battery for a third time period determined as a function of the first and second time periods.

15. The method of claim 14 further comprising determining the third time period to be equal to about one-half of the sum of the first and the second time periods.

16. The method of claim 13 further comprising:
 applying a large current to the battery for a first, predetermined time period;
 applying, after the first time period, a lesser current to the battery for a second time period terminating upon a battery voltage rising to a first magnitude; and
 applying, after the second time period, a minimum current to the battery for a third time period determined as a function of the first and second time periods.

17. The method of claim 13 further comprising:
 applying a large current to the battery for a first, predetermined time period;
 applying, after the first time period, the large current to the battery for a second time period terminating upon a battery voltage rising to a first magnitude; and
 applying, after the second time period, a minimum current to the battery for a third time period determined as a function of the first and second time periods.

18. A method of charging a lead acid battery comprising:
 applying a main charge current to the battery for a first time period terminating upon a battery voltage rising to a first magnitude; and
 applying, after the first time period, an absorption charge current to the battery for a second time; and
 applying, after the second time period, an equalization charge current to the battery for a third time period determined as a function of a length of the second time period.

19. The method of claim 18 further comprising determining the third period of time to be about one hour in response to the second period of time being less than about two hours.

20. The method of claim 19 further comprising determining the third period of time to be about two hours in response to the second period of time being between about two hours and about 4 hours.

21. The method of claim 19 further comprising determining the third period of time to be about four hours in response to the second period of time being more than about four hours.

22. A method of charging a lead acid battery comprising:
 applying a main charge current to the battery for a first time period terminating upon a battery voltage rising to a first magnitude;
 applying, after the first time period, an absorption charge current to the battery for a second time period determined as a function of a time elapsing from an application of the main charge current until the battery voltage rises to the first magnitude; and
 applying, after the second time period, an equalization charge current to the battery for a third time period determined as a function of a time elapsing from an application of the main charge current until the battery voltage rises to the first magnitude.

23. A method of charging a lead acid battery comprising:
 applying a large current to the battery during a bulk charge period terminating upon a battery voltage rising to a first magnitude;
 applying a minimum current to the battery during an absorption charge period determined as a function of a time elapsing from an application of the first current until the battery voltage rises to the first magnitude; and
 applying the minimum current to the battery during an equalization charge period determined as a function of a length of the absorption charge period.

24. A method of charging a lead acid battery comprising:
 detecting a first battery voltage before applying a charge current;
 applying an evaluation current to the battery during an evaluation time period;
 detecting a second battery voltage during the evaluation time period;

determining a deep discharge condition in response to the first battery voltage being below a first voltage reference and the second battery voltage being above a second voltage reference; and applying a desulfation charge current for a first time period in response to determining a deep discharge condition.

25. The method of claim 24 further comprising applying the evaluation current to the battery for a predetermined evaluation time period.

26. The method of claim 25 further comprising applying the evaluation current to the battery for an evaluation time period of about one minute.

27. The method of claim 25 further comprising applying the desulfation charge current for a predetermined time period in response to determining a deep discharge condition.

28. The method of claim 25 further comprising applying the desulfation charge current for a time period of about two hours in response to determining a deep discharge condition.

29. A method of charging a lead acid battery comprising:

detecting a first battery voltage before applying a charge current;

applying a larger current to the battery during an evaluation time period;

detecting a second battery voltage during the evaluation time period;

determining a deep discharge condition in response to the first battery voltage being below a first voltage reference and the second battery voltage being above a second voltage reference;

applying a lesser charge current for a desulfation charge time period in response to determining a deep discharge condition;

applying the lesser charge current to the battery for a bulk charge time period terminating upon a battery voltage rising to a first magnitude; and applying a minimum charge current to the battery for an absorption charge period determined as a function of the bulk charge period; and applying the minimum charge current to the battery for an equalization charge period determined as a function of the absorption charge period.

30. A method of charging a lead acid battery comprising:

detecting a first battery voltage before applying a charge current;

applying a larger current to the battery during an evaluation time period;

detecting a second battery voltage during the evaluation time period;

determining a normal discharge condition in response to the first battery voltage not being below a first voltage reference;

applying the larger charge current for a fast charge time period in response to the normal discharge condition;

applying the lesser charge current to the battery for a bulk charge time period terminating upon a battery voltage rising to a first magnitude; and applying a minimum charge current to the battery for an absorption charge period determined as a function of the fast and bulk charge periods; and applying the minimum charge current to the battery for an equalization charge period determined as a function of the absorption charge period.

31. A battery charger for a lead acid battery comprising:

a power supply having an input adapted to be connected to an AC signal and an output adapted to be connected to the battery, the power supply having an output providing a charge current to the battery;

a switch operatively connected to the power supply for turning the power supply on and off to provide charge current pulses to the battery;

a remote module locatable remote from the battery charger and having a sensory perceptible indicator representing a state of operation of the battery charger;

a charge control electrically connected to the switch for commanding an operation of the switch to cause the power supply to provide a coded series of charge current pulses to the battery representing a desired state of operation of the sensory perceptible indicator; and the remote module being electrically connected to the output of the power supply and including a control for decoding the coded series of charge current pulses and operating the sensory perceptible indicator in accordance with the desired state of operation.

32. The battery charger of claim 31 wherein the remote module further comprises a plurality of sensory perceptible indicators.

33. The battery charger of claim 31 wherein the remote module further comprises a plurality of visible indicators.

34. The battery charger of claim 31 wherein the remote module further comprises a plurality of LEDs.

35. The battery charger of claim 31 wherein the coded series of charge current pulses further comprises a combination of an absence and presence of charge current pulses.

36. A method of operating sensory perceptible indicators on a battery charger comprising:

producing a series of charge current pulses to the battery from a power supply having an input connected to an AC signal;

encoding the series of charge current pulses by intermittently omitting in accordance with a code at least one of the charge current pulses from the series of charge current pulses to represent a desired state of operation of one of the sensory perceptible indicators;

detecting with a control in a remote module locatable remote from the battery charger and electrically connected to the output of the power supply an omission of the one of the charge current pulses from the series of charge current pulses;

decoding with the control in the remote module the omission of the one of the charge current pulses from the series of charge current pulses; and operating the one of the sensory perceptible indicators in accordance with the desired state of operation.

37. The method of claim 36 further comprising iterating the steps of encoding, detecting, decoding and operating to operate all of the sensory perceptible indicators in accordance with their desired states of operation.

\* \* \* \* \*